United States Patent
Denecheau et al.

(10) Patent No.: US 7,796,539 B2
(45) Date of Patent: *Sep. 14, 2010

(54) SYSTEM, COMPUTER PROGRAM PRODUCT AND METHOD IN A NODE FOR OPTIMIZING THE TOPOLOGY OF A VIRTUAL RING BASED UPON A TCP/IP NETWORK

(75) Inventors: Lionel Denecheau, La Colle sur Loup (FR); Jean-Claude Dispensa, Saint Jeannet (FR); Denis Esteve, Vence (FR)

(73) Assignee: International Business Machines Corporation, Armonk, NY (US)

( * ) Notice: Subject to any disclaimer, the term of this patent is extended or adjusted under 35 U.S.C. 154(b) by 229 days.

This patent is subject to a terminal disclaimer.

(21) Appl. No.: 11/932,342

(22) Filed: Oct. 31, 2007

(65) Prior Publication Data
US 2008/0056281 A1    Mar. 6, 2008

Related U.S. Application Data

(63) Continuation of application No. 11/542,698, filed on Oct. 3, 2006, now Pat. No. 7,715,330.

(30) Foreign Application Priority Data
Oct. 6, 2005    (EP) .................................. 05300797

(51) Int. Cl.
H04L 12/28    (2006.01)
(52) U.S. Cl. ...................... 370/254; 370/231; 370/255; 370/400
(58) Field of Classification Search ........................ None
See application file for complete search history.

(56) References Cited

U.S. PATENT DOCUMENTS

| | | | | |
|---|---|---|---|---|
| 4,507,777 | A * | 3/1985 | Tucker et al. | 370/258 |
| 5,276,703 | A * | 1/1994 | Budin et al. | 375/130 |
| 5,408,618 | A * | 4/1995 | Aho et al. | 710/104 |
| 5,742,605 | A * | 4/1998 | Norman, Jr. | 370/405 |
| 5,923,831 | A * | 7/1999 | Palmer et al. | 714/12 |
| 6,490,247 | B1 * | 12/2002 | Gilbert et al. | 370/222 |
| 6,650,625 | B1 * | 11/2003 | Norizuki et al. | 370/254 |
| 6,901,510 | B1 * | 5/2005 | Srivastava | 713/163 |

(Continued)

*Primary Examiner*—Ayaz R Sheikh
*Assistant Examiner*—Faiyazkhan Ghafoerkhan
(74) *Attorney, Agent, or Firm*—Anthony V S England; William H Steinberg

(57) ABSTRACT

In a network having nodes, N nodes are members of a virtual communications ring for multicast communication among the N Nodes, each of the N Nodes being associated with only an upstream and a downstream one of the other N nodes. One of the N nodes manages changes in ring membership, including requesting the others of the N nodes to participate in measuring distances to a N+1th, node responsive to receiving an insertion request message. The manager node inserts the N+1th node in the communications ring responsive to receiving replies, which includes inserting the N+1th node in a selected location between two selected ones of the N Nodes, such that the N nodes and the N+1th node are enabled to multicast messages around the ring. Due to the selected location of the N+1th node, communication distances for multicasted messages tend to be shorter than such distances that would otherwise occur.

20 Claims, 19 Drawing Sheets

New node insertion mechanism with
Logical Distance computing

U.S. PATENT DOCUMENTS

| | | | |
|---|---|---|---|
| 7,006,434 B1 * | 2/2006 | Klein et al. | 370/223 |
| 7,027,733 B2 * | 4/2006 | Feuer et al. | 398/72 |
| 7,054,951 B1 * | 5/2006 | Kao et al. | 709/242 |
| 7,181,547 B1 * | 2/2007 | Millet | 709/251 |
| 7,362,718 B2 * | 4/2008 | Kakivaya et al. | 370/254 |
| 2002/0172157 A1 * | 11/2002 | Rhodes | 370/238 |
| 2003/0206548 A1 * | 11/2003 | Bannai et al. | 370/389 |
| 2004/0103179 A1 * | 5/2004 | Damm et al. | 709/223 |
| 2004/0179518 A1 * | 9/2004 | Bruckman et al. | 370/358 |
| 2004/0203600 A1 * | 10/2004 | McCorkle et al. | 455/411 |
| 2004/0208561 A1 * | 10/2004 | Kinoshita et al. | 398/59 |
| 2005/0094577 A1 * | 5/2005 | Ashwood-Smith | 370/257 |
| 2005/0237948 A1 * | 10/2005 | Wan et al. | 370/254 |
| 2007/0081461 A1 * | 4/2007 | Denecheau et al. | 370/231 |
| 2007/0268913 A1 * | 11/2007 | Denecheau et al. | 370/397 |
| 2009/0074413 A1 * | 3/2009 | Bannai et al. | 398/59 |

* cited by examiner

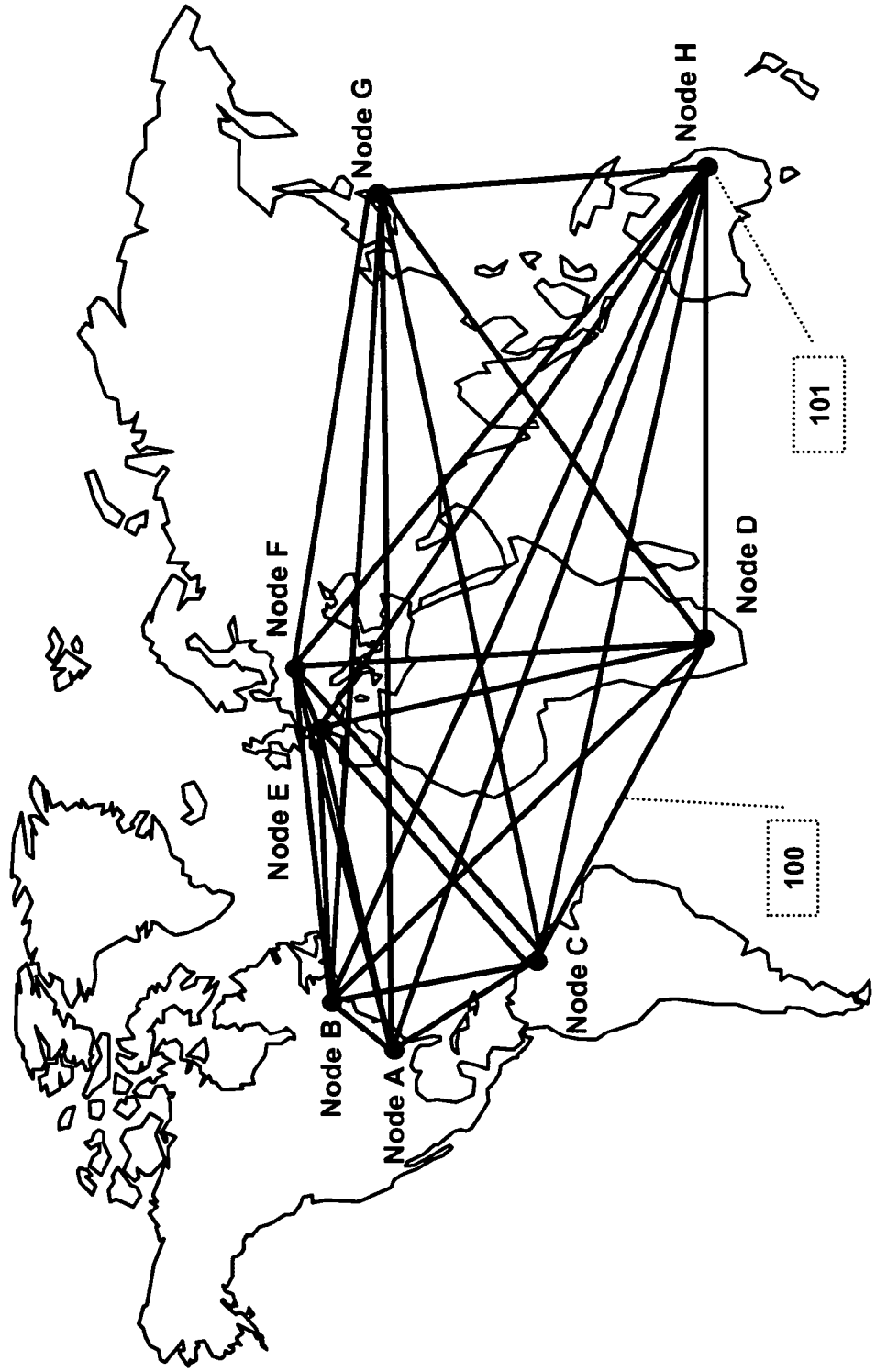
Figure 1 : Full mesh network

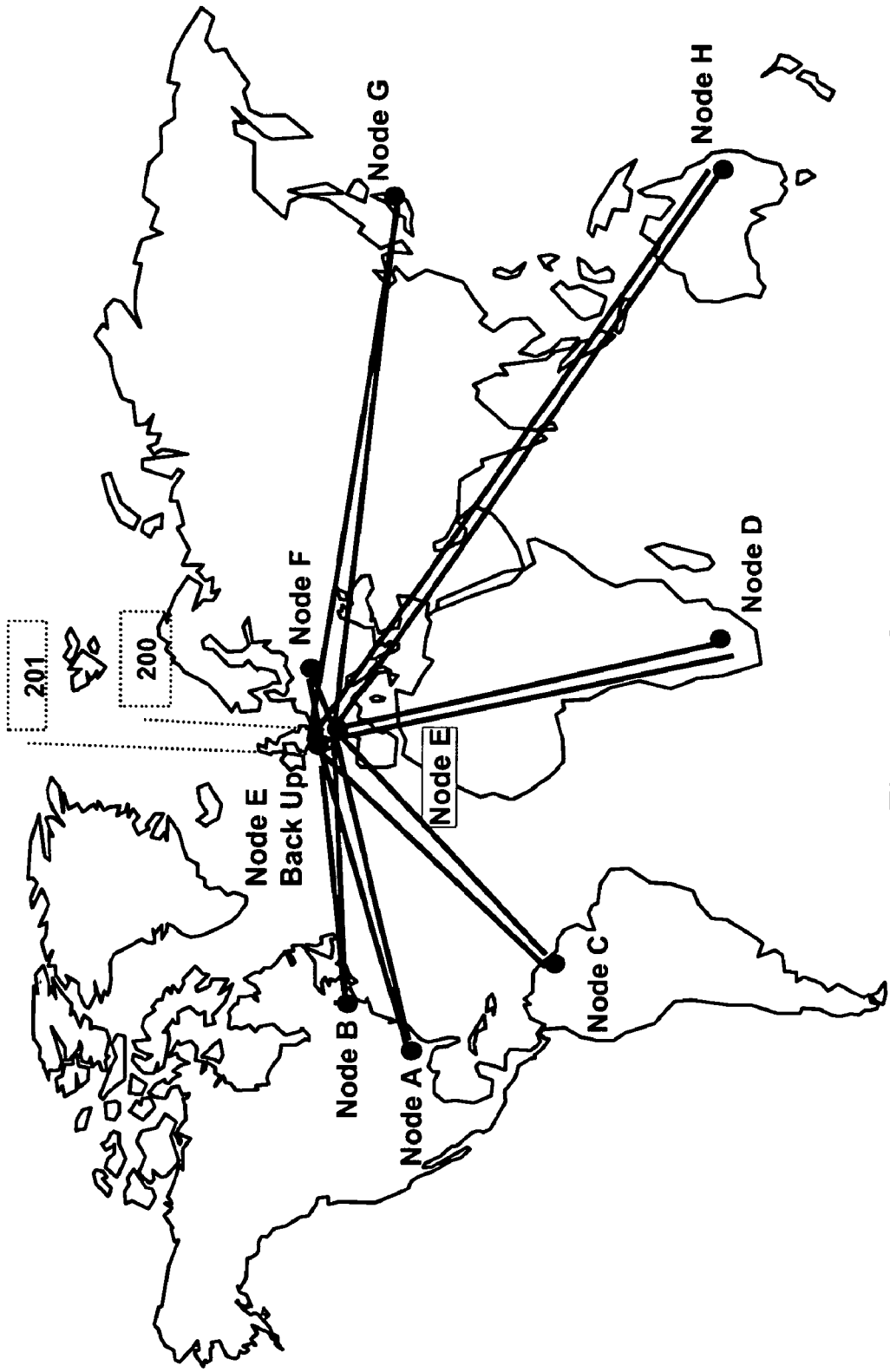
Figure 2: Star network

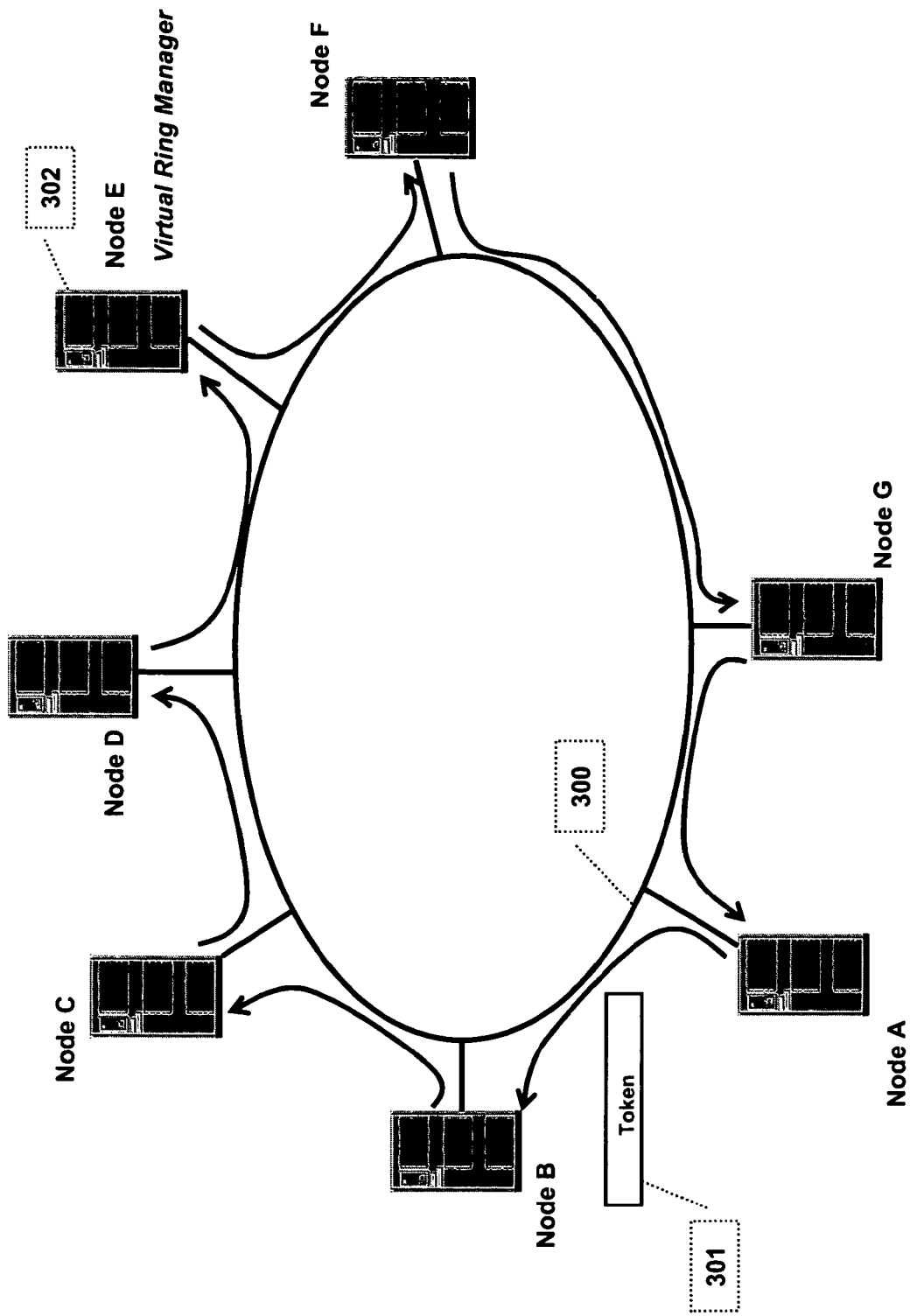
Figure 3: Token on Virtual Ring

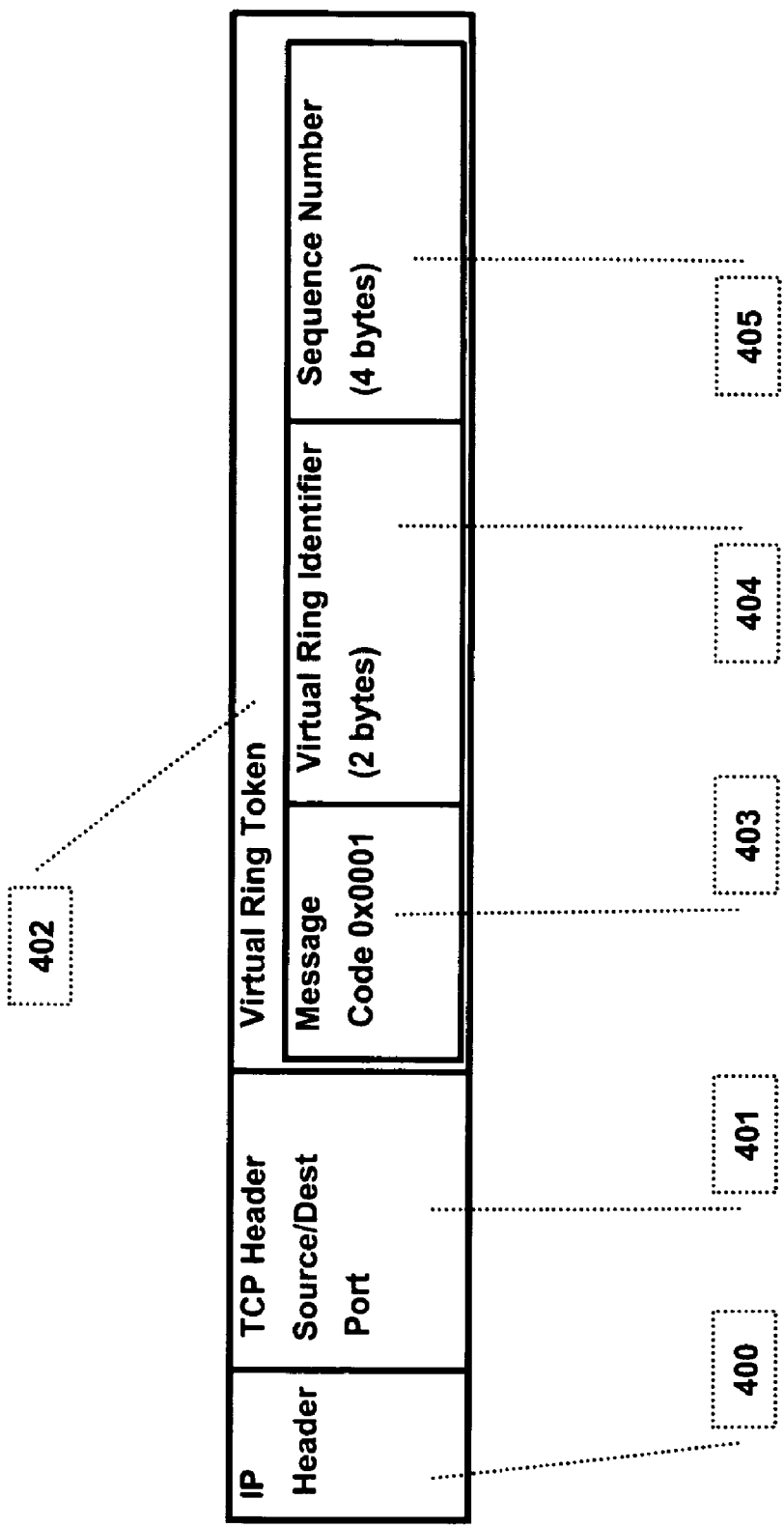
Figure 4: Token description

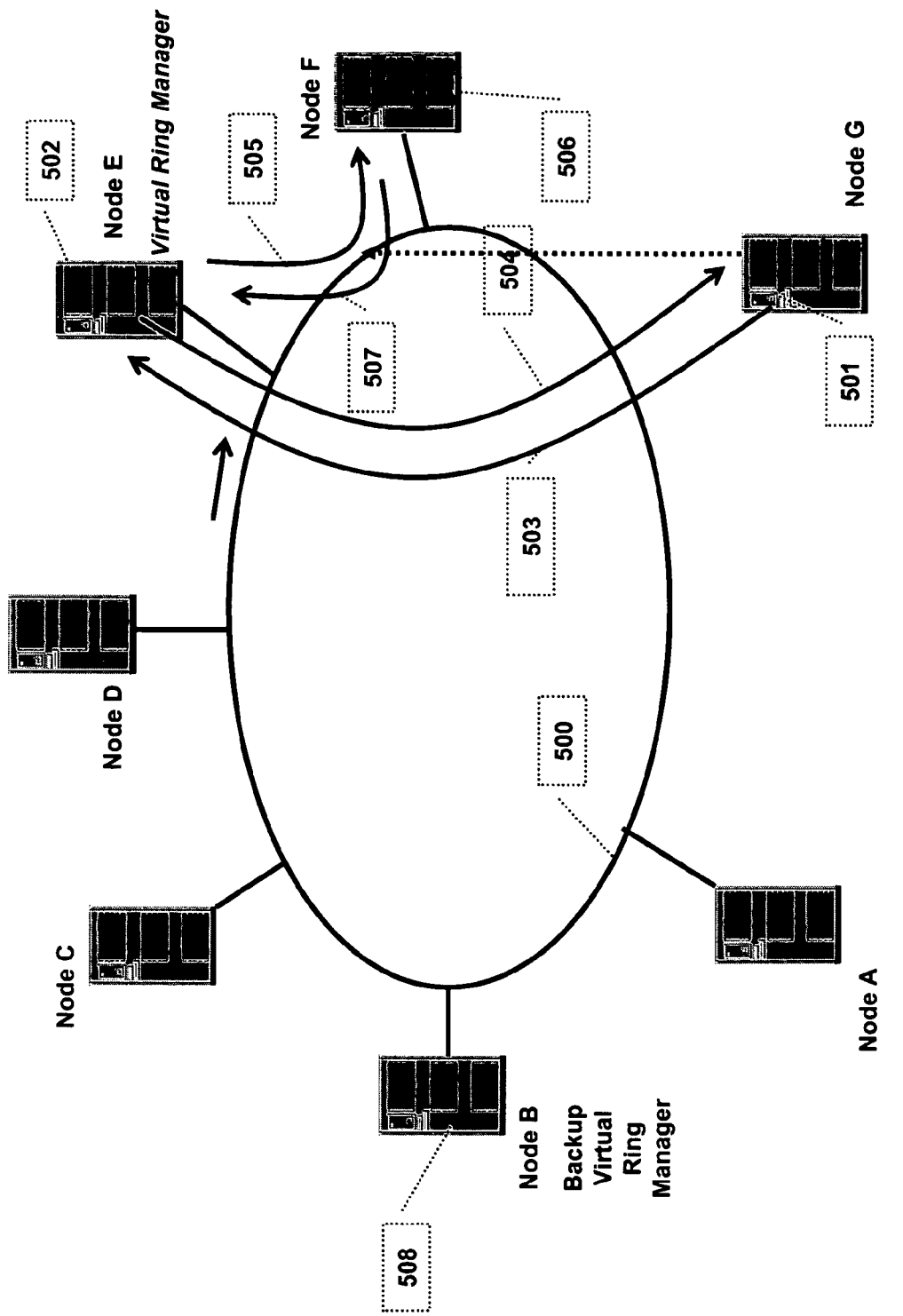
Figure 5: Node insertion on the Virtual Ring

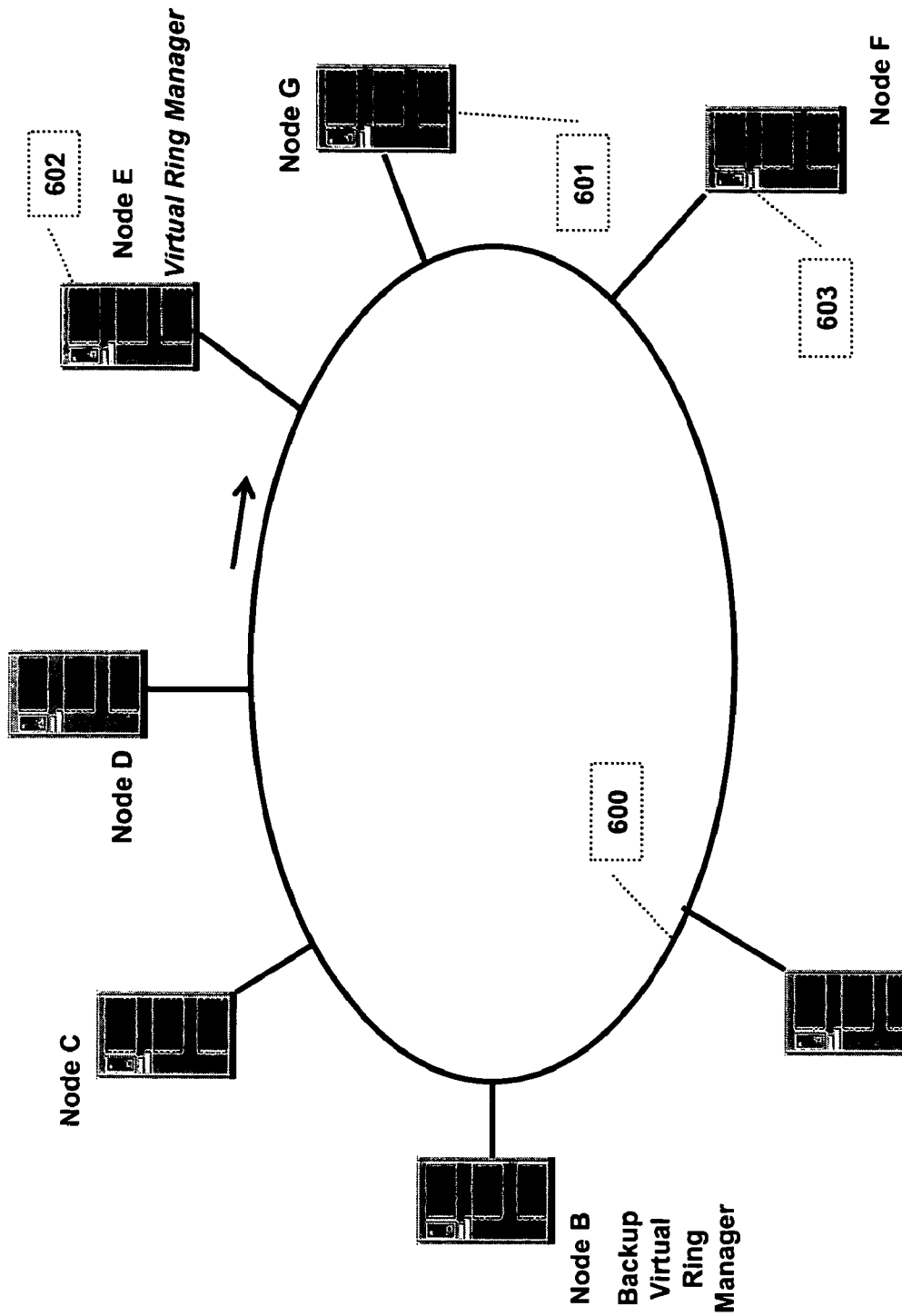
Figure 6: Node insertion on the Virtual Ring - Result

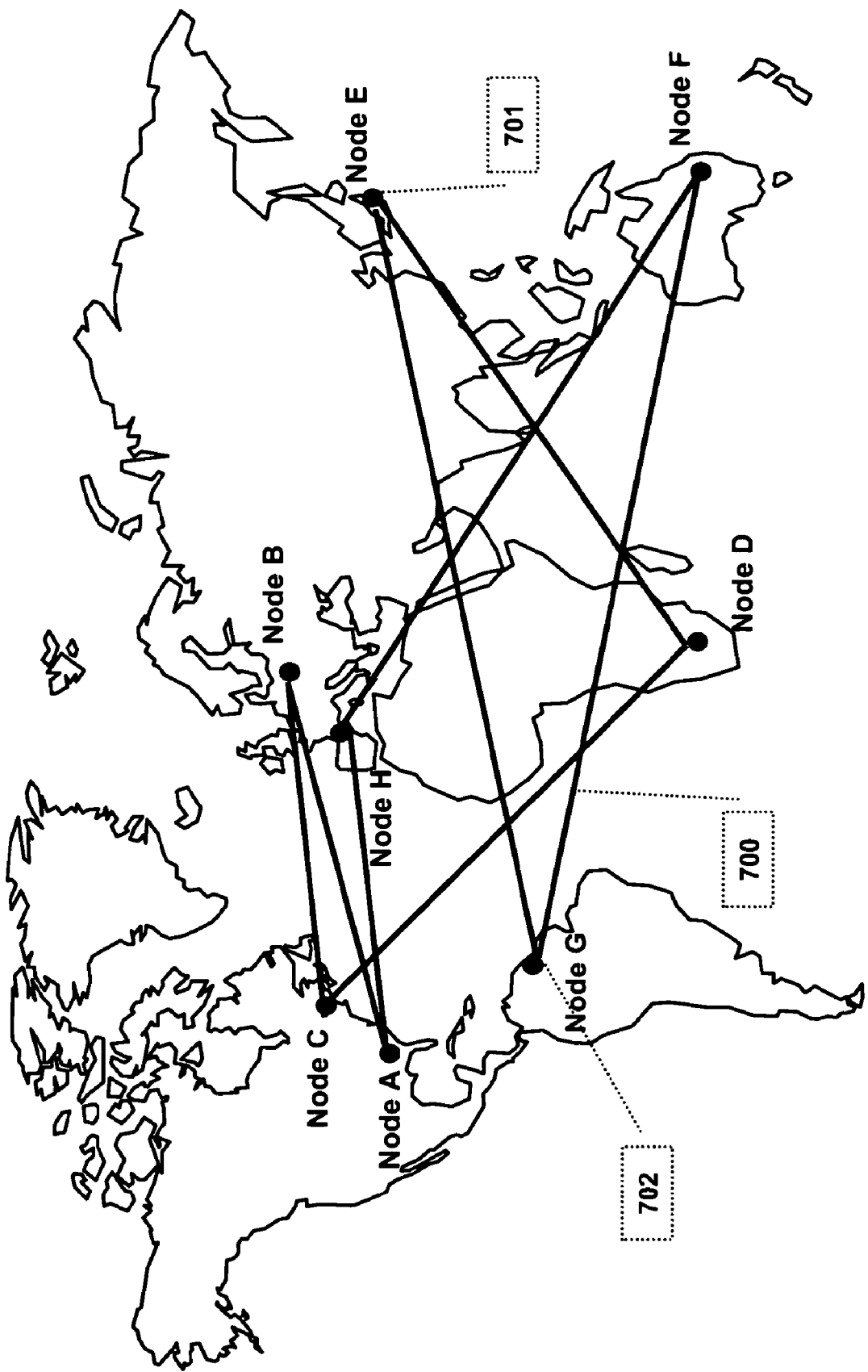
Figure 7: Virtual Ring Network

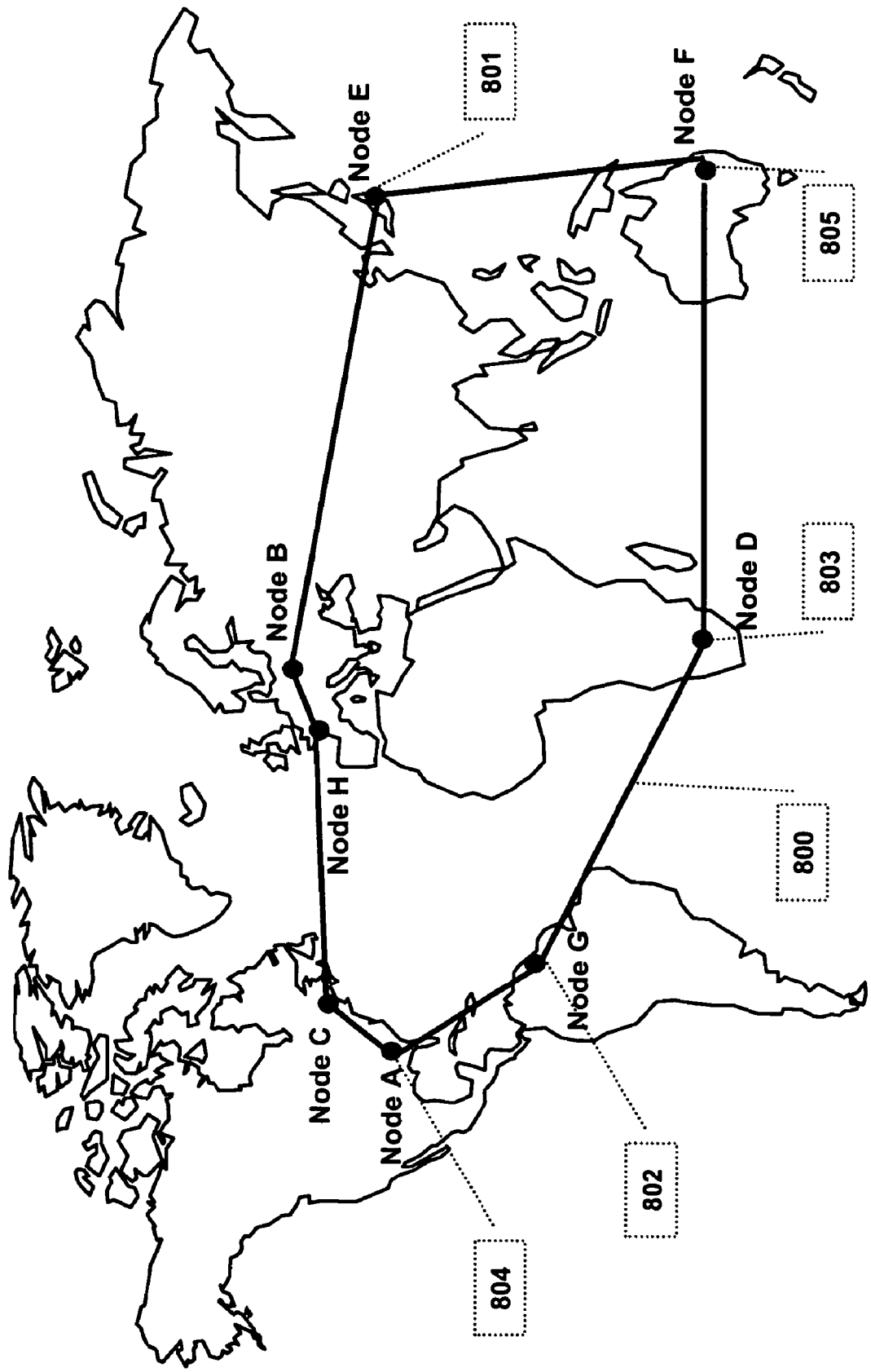
Figure 8: Virtual Ring Network with improved Topology

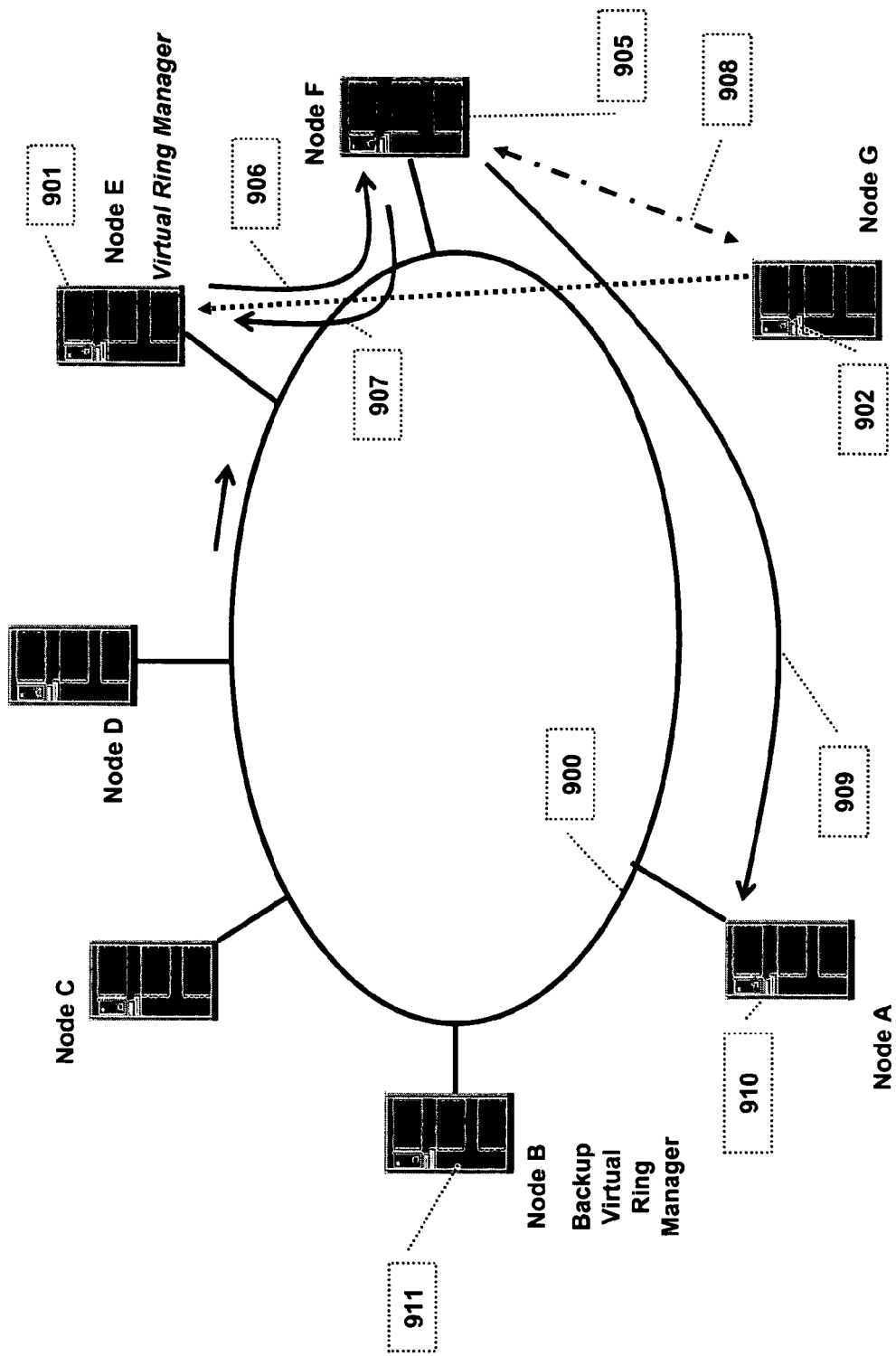
Figure 9: New node insertion mechanism with Logical Distance computing

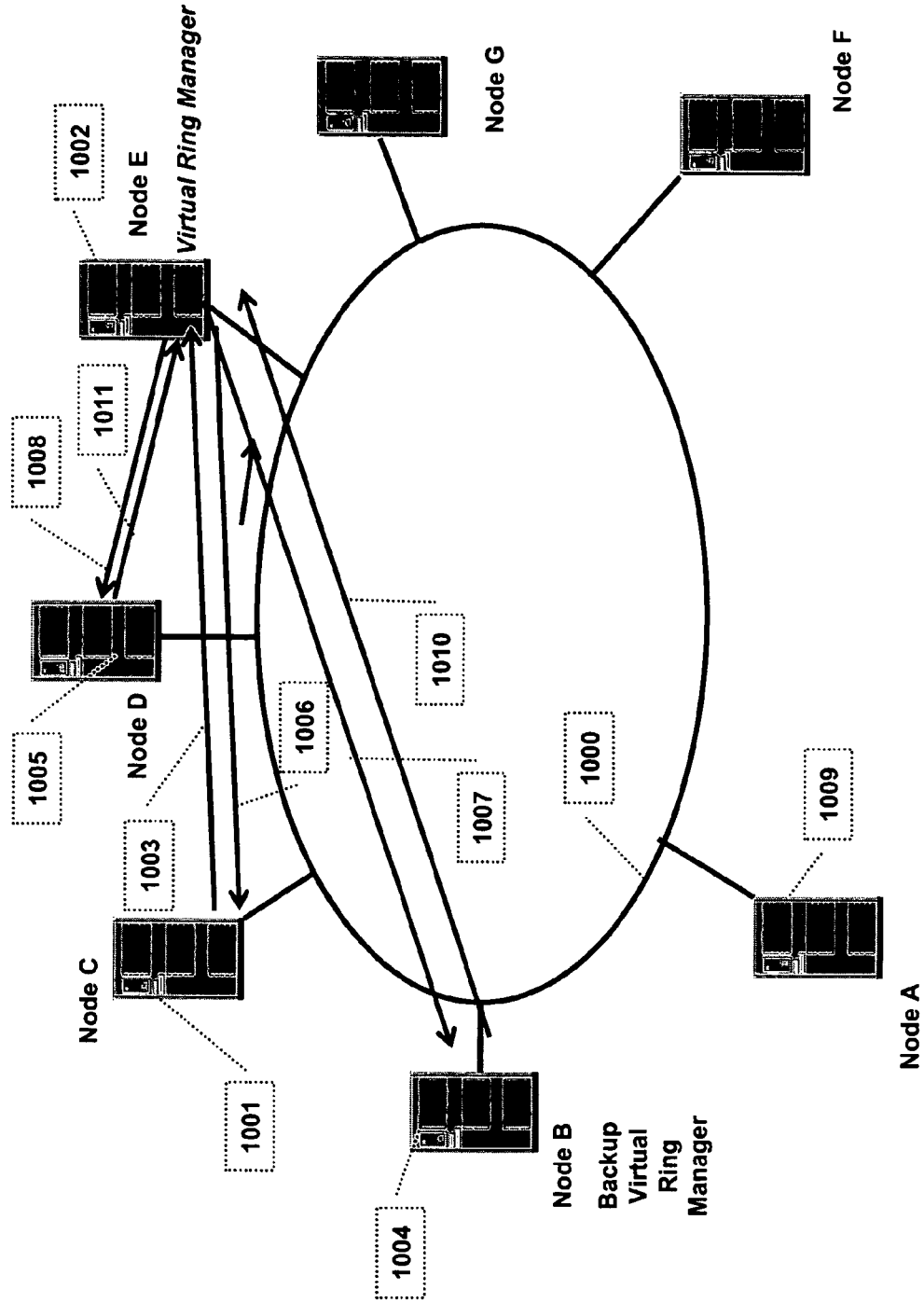
Figure 10: Node solicited removal from the Virtual Ring

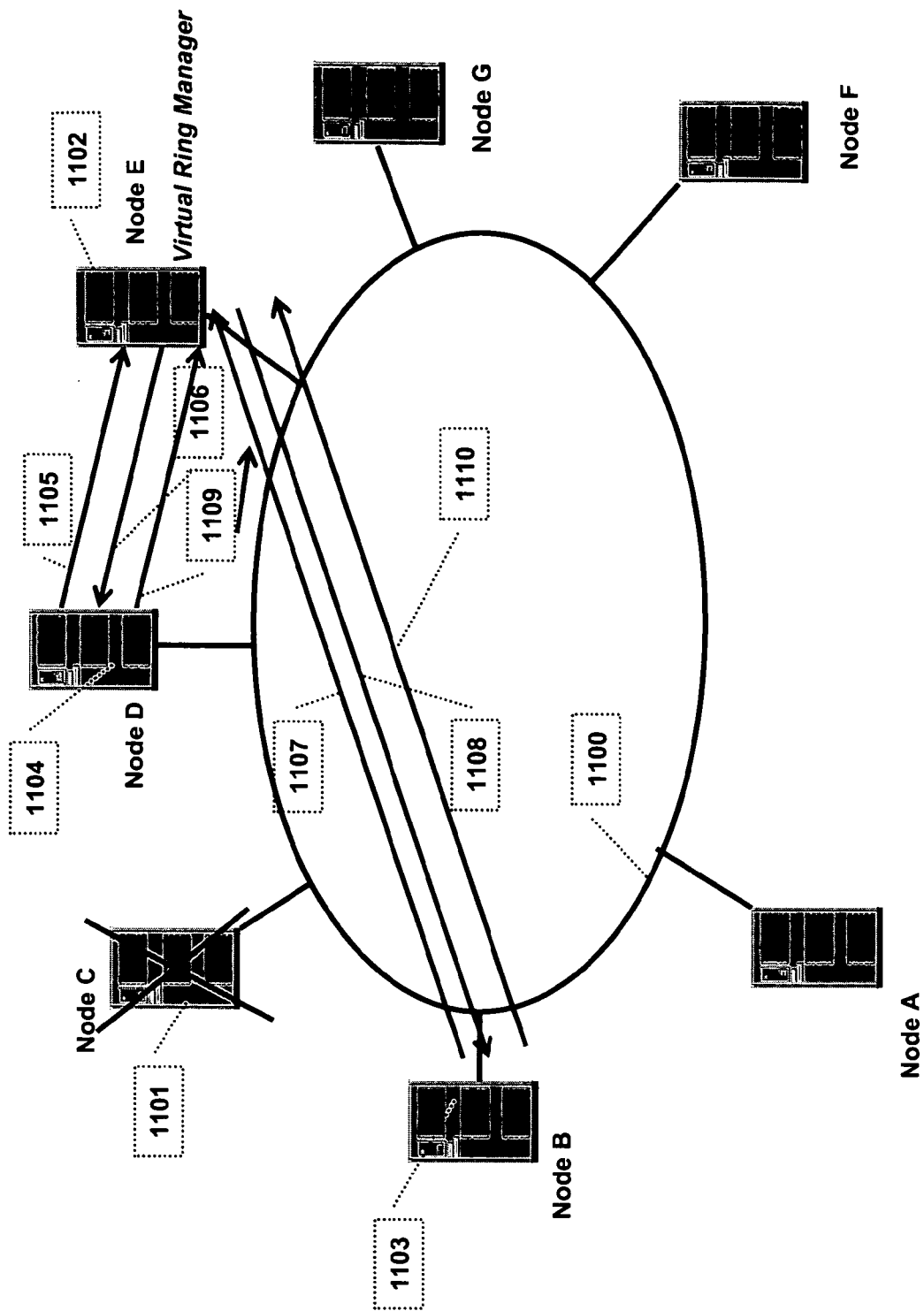
Figure 11: Loss of a Node

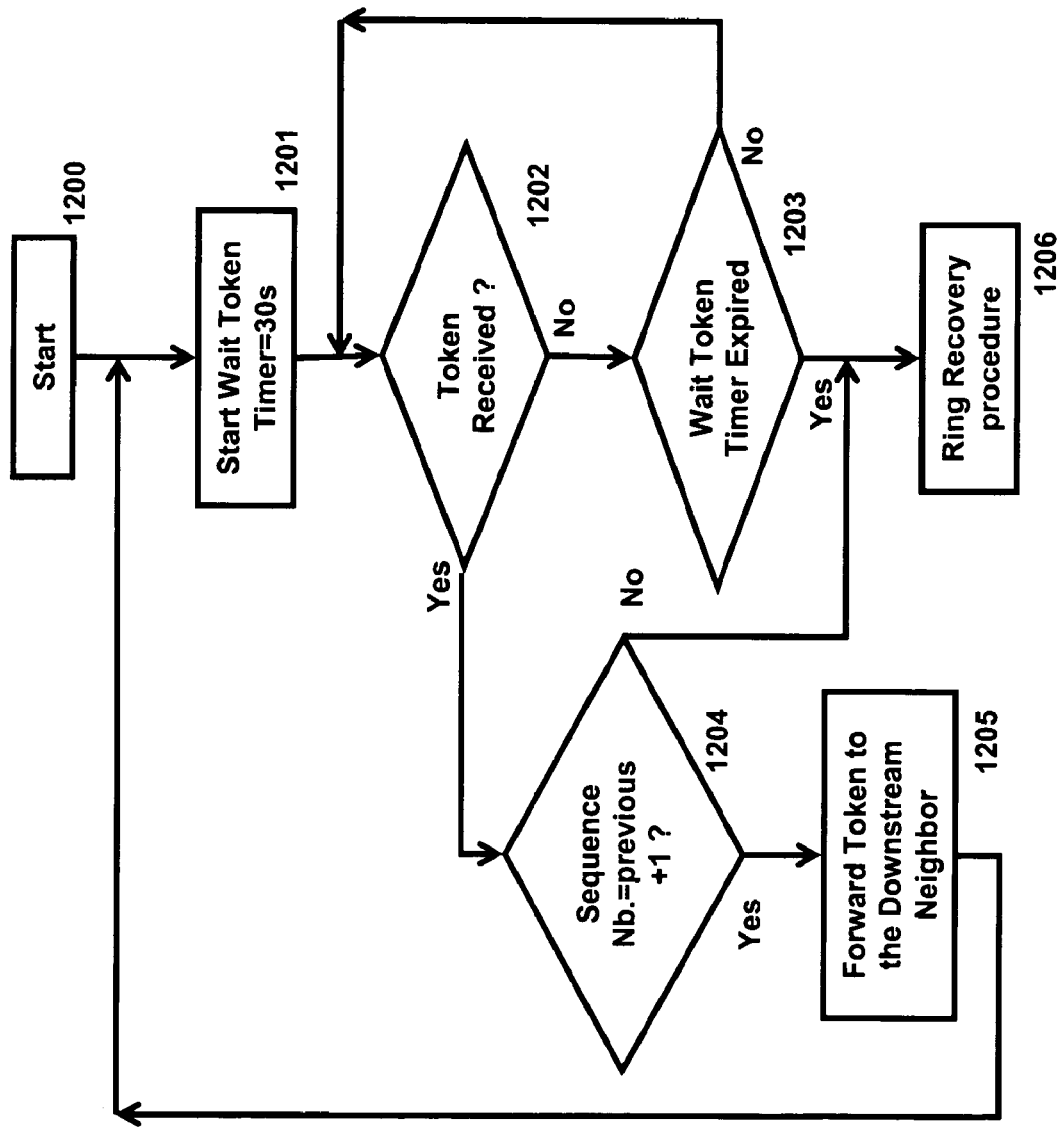
Figure 12: Token Processing by a node

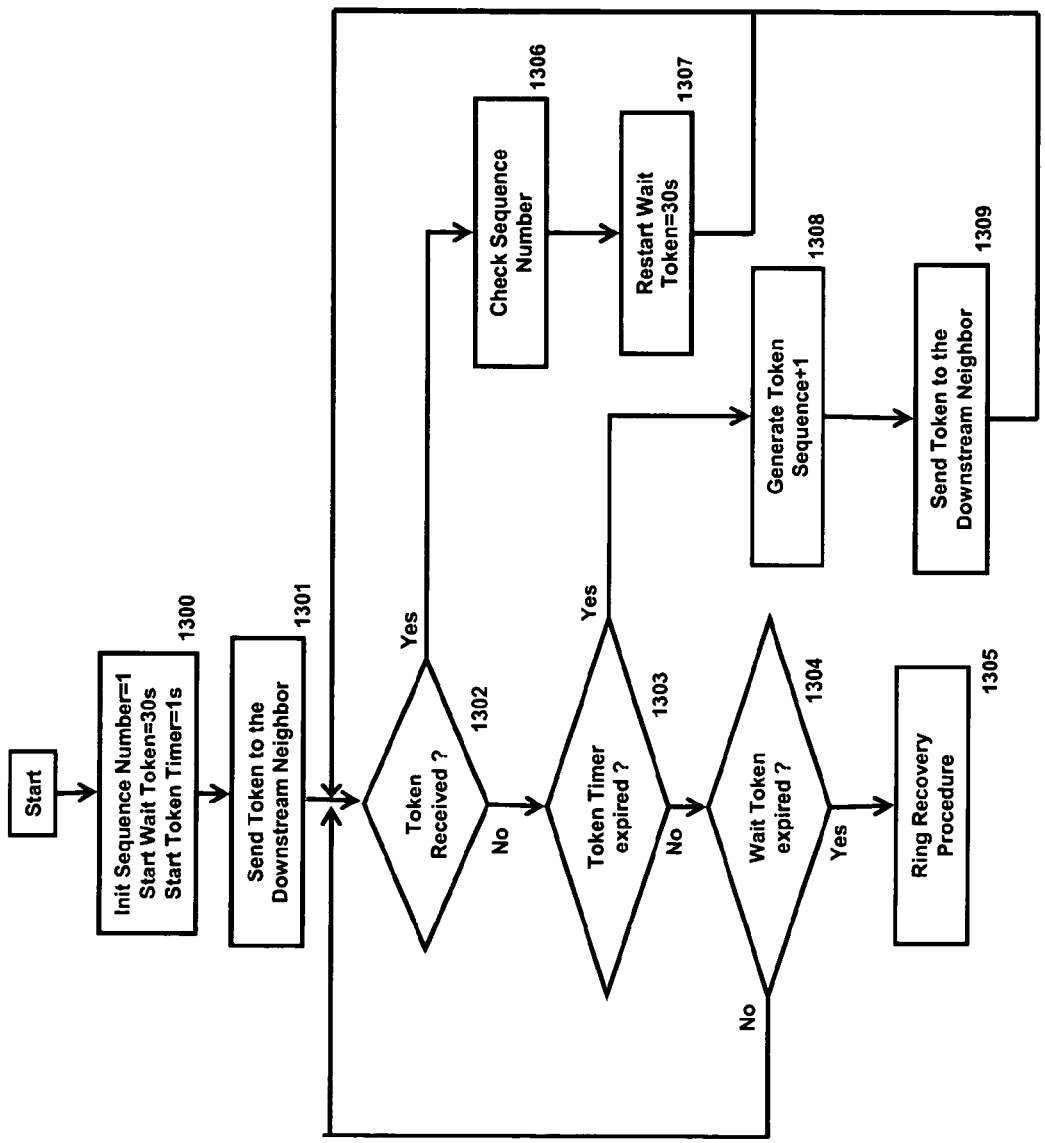
Figure 13: Virtual Ring Manager: Token Management

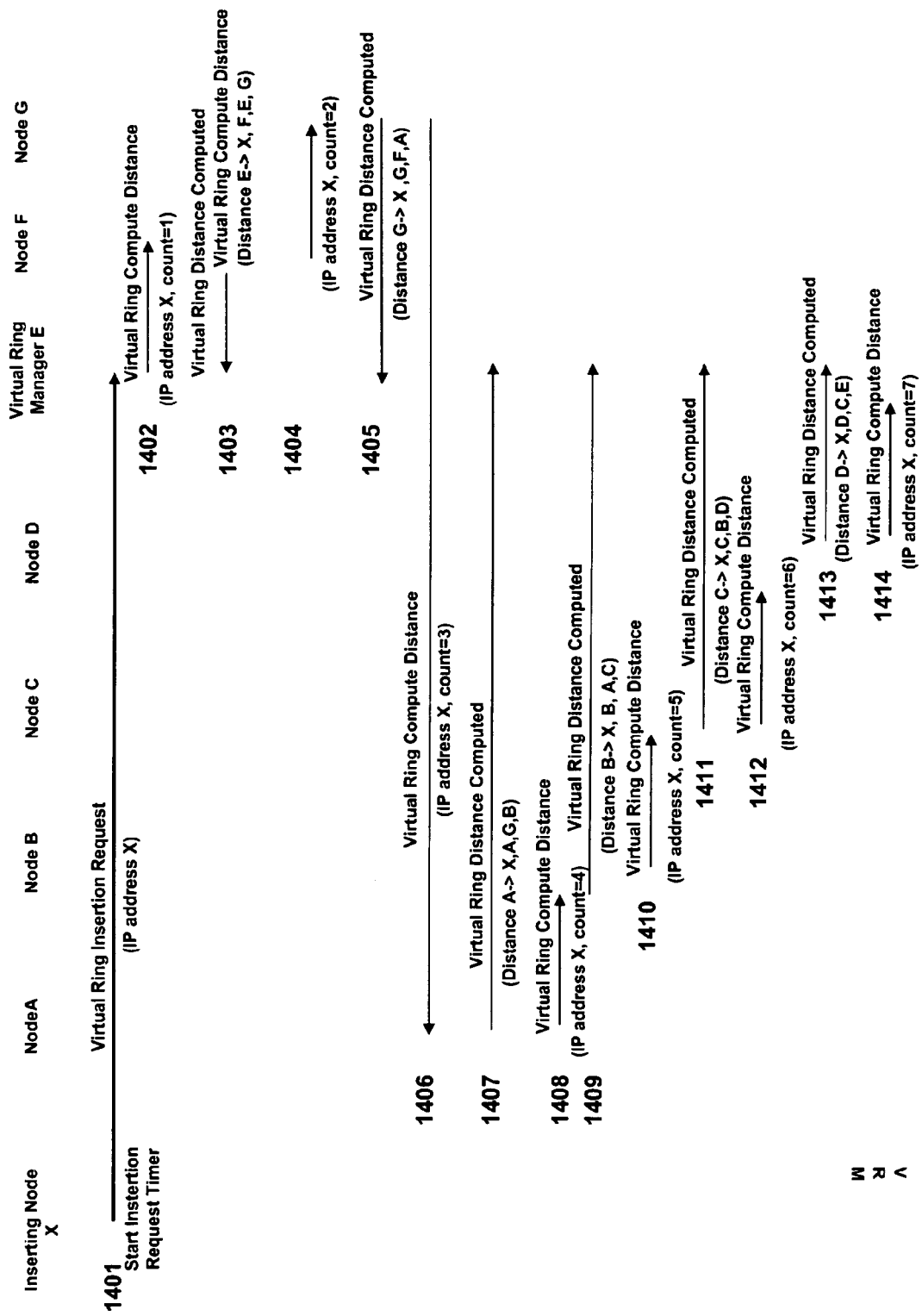
Figure 14: Flow of a Node Insertion

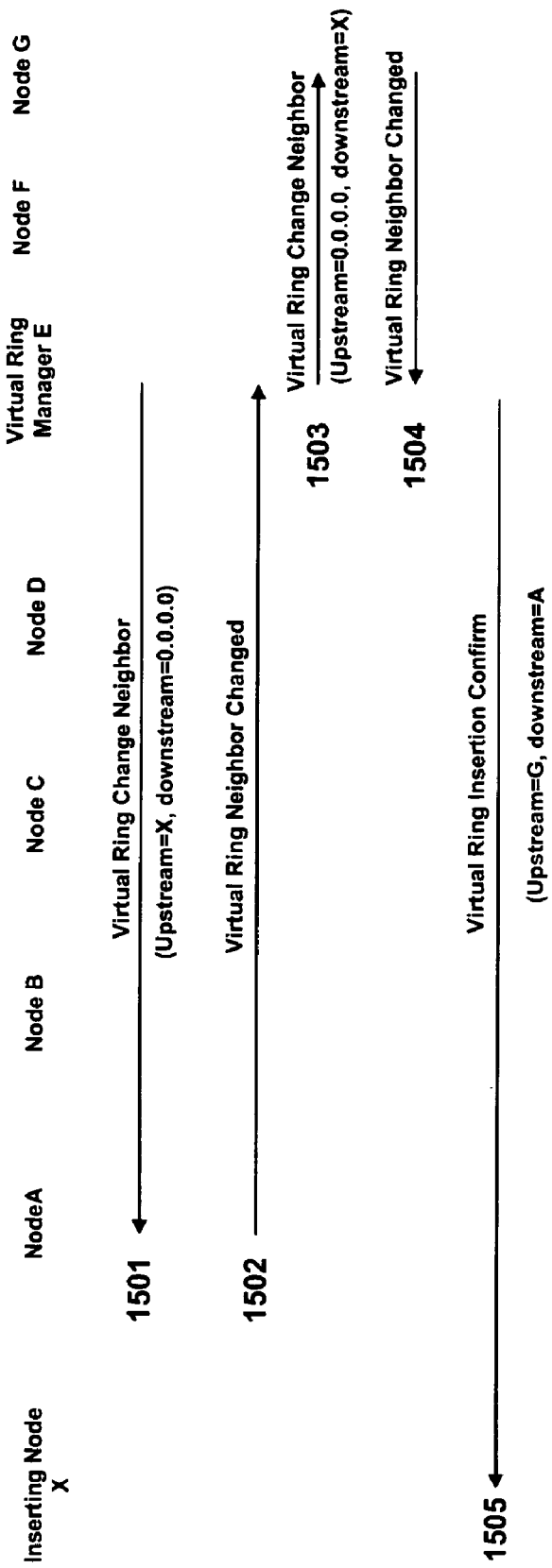
Figure 15: Flow of a Node Insertion (continued)

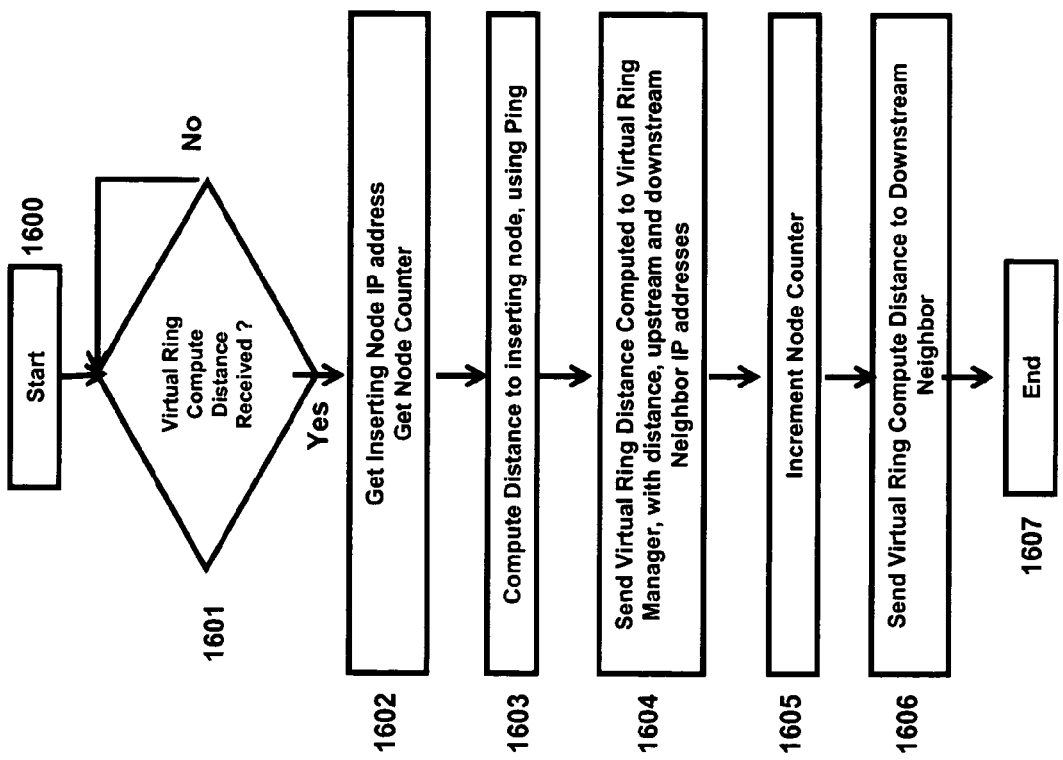
Figure 16: New Insertion Algorithm in a node

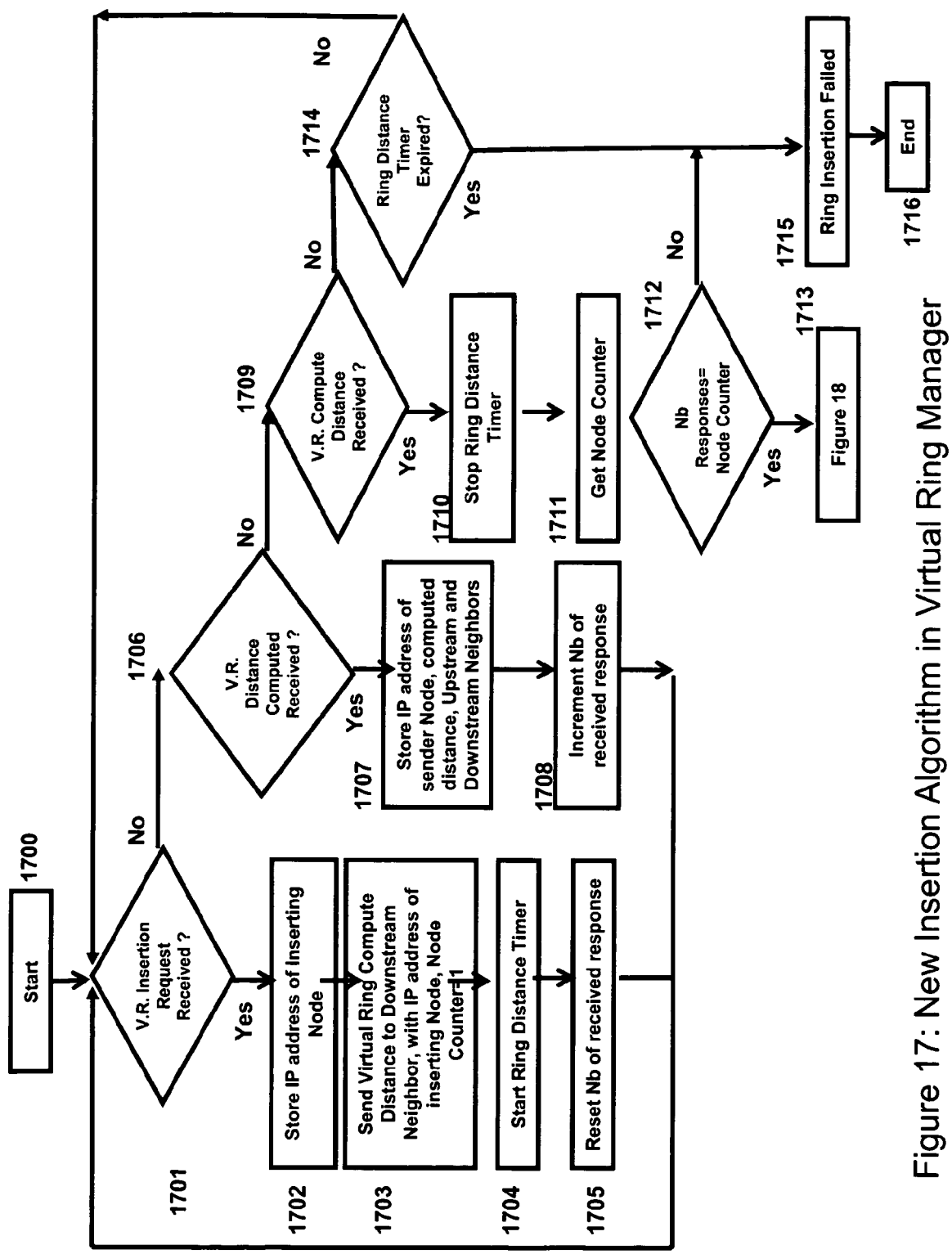
Figure 17: New Insertion Algorithm in Virtual Ring Manager

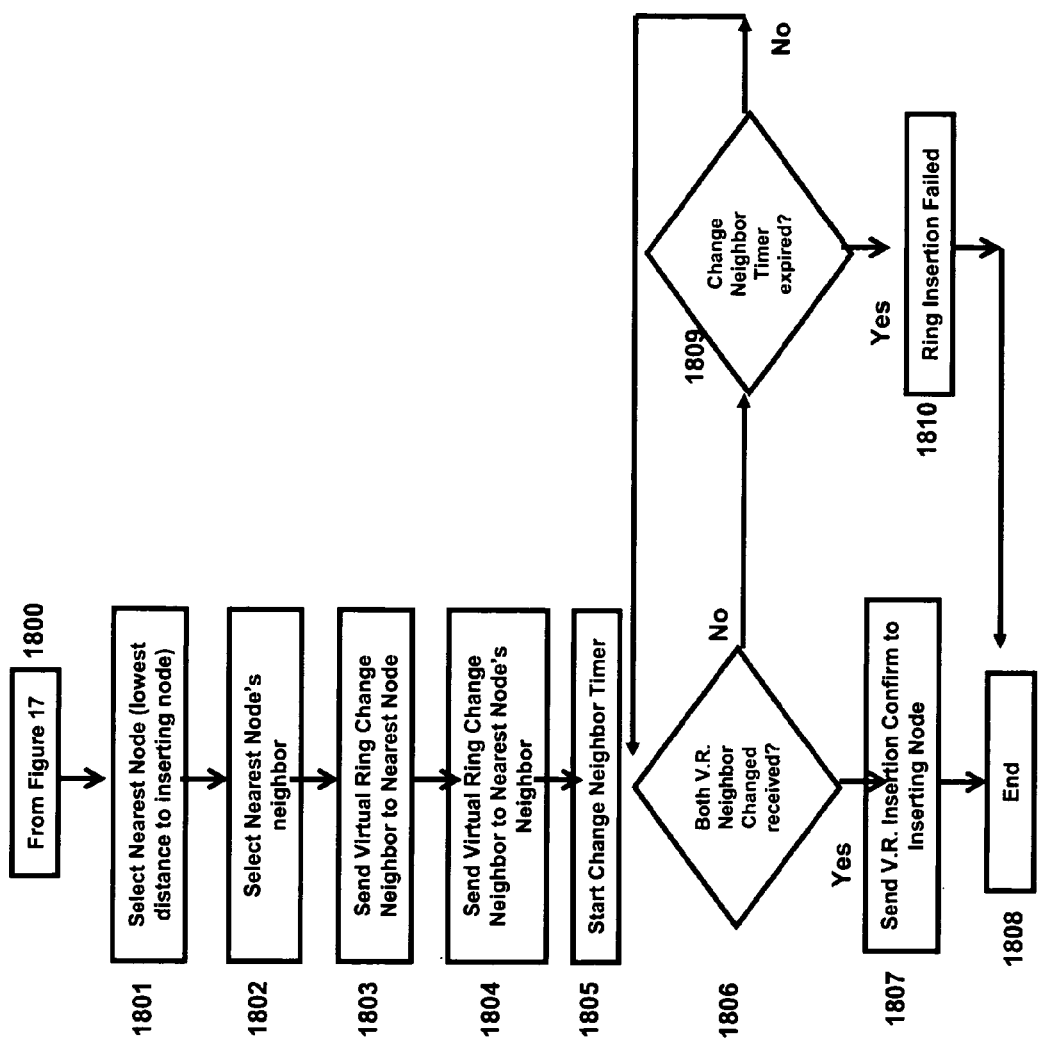
Figure 18 : New Insertion Algorithm in Virtual Ring Manger (Continued)

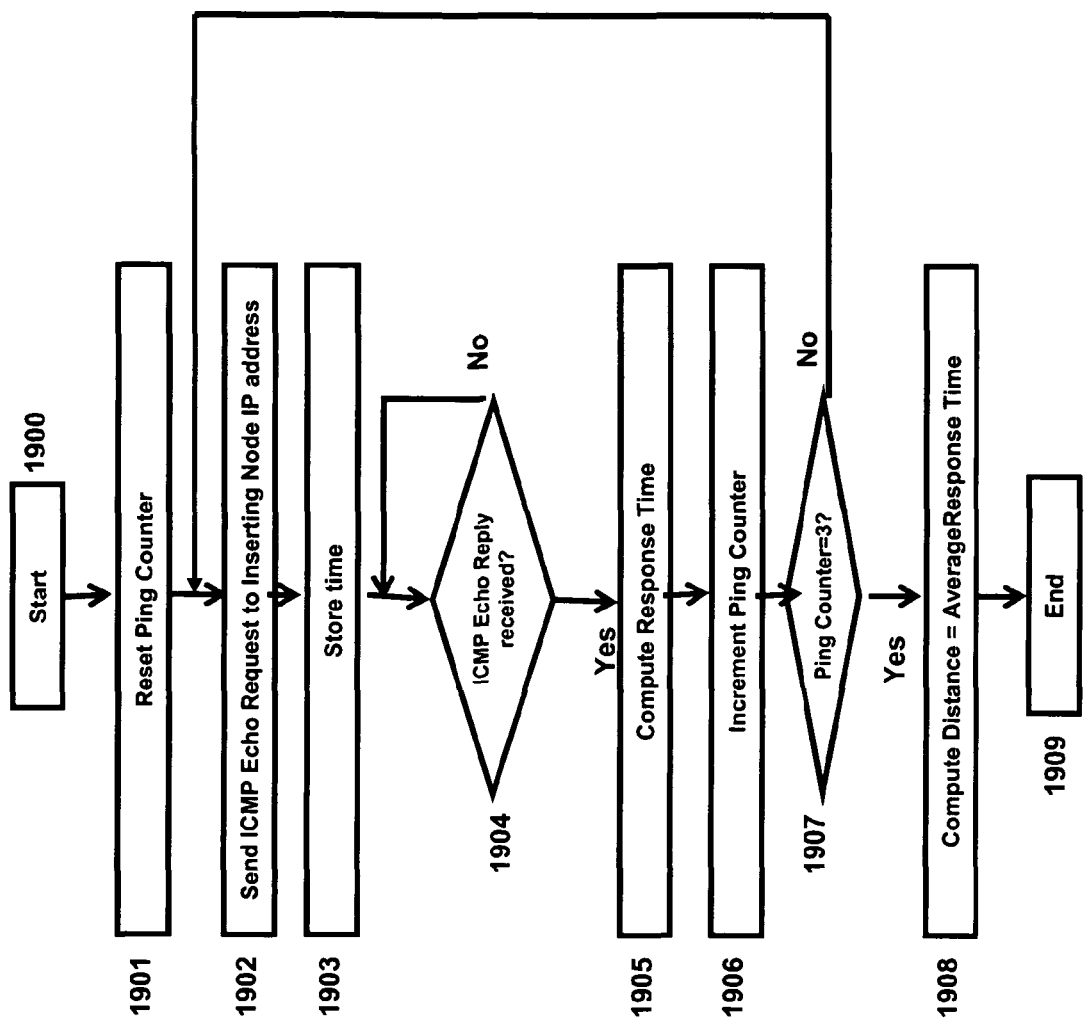
Figure 19: Distance determination

SYSTEM, COMPUTER PROGRAM PRODUCT AND METHOD IN A NODE FOR OPTIMIZING THE TOPOLOGY OF A VIRTUAL RING BASED UPON A TCP/IP NETWORK

CROSS REFERENCE TO RELATED APPLICATION

This is a continuation of, and hereby claims the benefit of the priority date of, application Ser. No. 11/542,698 which was filed Oct. 3, 2006 now U.S. Pat. No. 7,715,330, and application 05300797.7/EP05300797, which was filed in the European Patent Office, Oct. 6, 2005.

FIELD OF THE INVENTION

This application is a U.S. counterpart application of earlier filed application 05300797.7/EP05300797, which was filed in the European Patent Office, Oct. 6, 2005. Applicants hereby claim the benefit of this earlier filed application under 35 U.S.C. 119.

The present invention relates to communication on digital networks, and more particularly to a system and a method for optimizing the topology of a virtual ring used to multicast datagrams in a TCP/IP (Transmission Control Protocol/Internet Protocol) environment.

BACKGROUND OF THE INVENTION

Topology of Networks

In the present description, the term "Network" designates an ordinary network, based on the Internet Protocol (IP) technology. This network can be a Local Area Network (LAN), but also an Enterprise (private) Intranet or even the (public) Internet. The term "Node" designates the computer systems in the network routing the communications, such as routers, and, also, the computer systems exchanging information on the network, such as workstations and servers.

In a network, nodes must be able to exchange information with other nodes of a same group. For instance, the broadcast of a same information to multiple nodes located in different locations is called "Multicast". In a group of N nodes called a Multicast group as illustrated in FIG. 1, each node (101) needs to communicate with the (N−1) other nodes. To do this, each node establishes a session with each other node (100). Usually in IP networks, the Transmission Control Protocol (TCP) is used to communicate between nodes because this protocol allows a reliable transport of data through sessions and takes care of the flow control. This is not the case with the transport protocol called UDP (User Datagram Protocol) which is based on the best effort and which does not provide any session mechanism.

If a node, within a group of N nodes, wants to communicate information to all the other nodes of its group, it requires N−1 TCP sessions. If all the nodes need to communicate together in a full mesh configuration, N×(N−1)/2 TCP sessions are required. It is important to note that since a TCP session is bidirectional, the required number of sessions is N×(N−1)/2 and not N×(N−1).

The number of sessions can be considerable in a network comprising hundreds or thousands of nodes. It can results an important overhead with a significant impact in term of bandwidth consumption in the network and resource (data processing and memory) utilisation in each node. In each node, the establishment the TCP sessions requires data processing resources and the maintenance of these TCP sessions requires memory in particular to store the context of the TCP sessions (TCP Control Block).

In absence of synchronisation at the application level, the nodes can exchange the same piece of information on all the TCP sessions at the same time (communication any to any). This is bandwidth consuming at the network level and resource consuming at the level of each node. An example of this scenario is the exchange of routing information between routers. Each router broadcast routing information to the other routers either periodically or when a change occurs, depending on the routing protocol used in the network. Another example is the synchronisation of multiple servers in a distributed database.

Several solutions exist to limit the number of sessions between nodes. A solution illustrated in FIG. 2, is to select a "Rendezvous Point", or a central node, to which all other nodes are connected. The central node (200) is responsible for distributing the information to all the other nodes in the network. This configuration called "Star network" reduces the number of connections (N−1 sessions) but the main drawback is due to the fact that the central node is the weakest point of the network. Generally, the central node is duplicated by means of a backup central node (201). This configuration called "Dual star network", requires (N−1)+(N−2) connections.

Note: the central node (200) is connected to all other nodes including the backup central node (201). The result is the establishment of N−1 TCP sessions. The addition of a second star configuration based on the backup central node (201) requires another N−1 TCP sessions. However, since a TCP session already exists between central node (200) and backup central node (201), this session does not need to be duplicated. In conclusion, the number of sessions required in a dual star configuration is (N−1)+(N−2)=2×N−3

Patent Application WO 2005/060156

International patent application WO 2005/060156 entitled "System and method for Communicating on a Virtual ring in an Internet Protocol Network" (Denecheau et al.) is directed to a method, system and computer program as defined in independent claims, to use in a node within a network comprising a transport layer protocol providing end to end data transfer, for multicasting datagrams on a virtual ring, each node on the virtual ring being logically connected according to the network transport layer protocol to two and only two neighbour nodes through virtual connections, an upstream neighbour node and a downstream neighbour node.

The method comprises the steps of:
sending a virtual ring datagram to the downstream neighbour node on the virtual ring; said virtual ring datagram comprising:
a virtual ring identifier;
means for identifying the node originator of the virtual ring datagram;
data;
when a datagram is received;
identifying the received datagram;
if the received datagram is a token:
identifying the virtual ring;
checking whether the token is valid or not;
if the token is valid, forwarding the token to the downstream neighbour node on the identified virtual ring.
if the received datagram is a virtual ring datagram:
identifying the virtual ring;
checking the node originator of the received virtual ring datagram;

if the received virtual ring datagram has not been locally originated:
  processing data comprised in said virtual ring datagram;
  forwarding said virtual ring datagram to the downstream neighbour node on the identified virtual ring;
if the received virtual ring datagram has been locally originated:
  removing the virtual ring datagram from the virtual ring.

OBJECTS OF THE INVENTION

It is an object of the invention to save bandwidth in an IP network comprising inter-communicating nodes.

It is another object of the invention to reduce the resource consumption of inter-communicating nodes.

It is a further object of the invention to define several groups of inter-communicating nodes in an IP network.

It is a further object of the invention to optimize the communications between inter-communicating.

It is a further object of the invention to optimize the topology of a virtual network of intercommunicating-nodes.

It is a further object of the invention to optimize the topology of a virtual token ring network.

SUMMARY OF THE INVENTION

The present invention is directed to a method, system and computer program as defined in independent claims, for optimizing the topology of a virtual ring used to multicast datagrams within a network comprising a transport layer protocol providing end to end data transfer, each node on the virtual ring being logically connected according to the network transport layer protocol to two and only two neighbour nodes through virtual connections, an upstream neighbour node and a downstream neighbour node.

More particularly, one form of the invention concerns a method in a network having nodes and a transport layer protocol providing end to end data transfer. N of the nodes are members of a virtual communications ring for multicast communication among the N nodes, each of the N member nodes being logically associated with only a logically upstream one of the N nodes and a logically downstream one of the N nodes. For the communications ring, one of the N nodes functions as a manager node for managing changes in ring membership. The method according to this form of the invention includes requesting, by the manager node, the others of the N member nodes to participate in measuring respective communication distances to a N+1th, non-member node responsive to the manager node receiving an insertion request message from the non-member node. The method further includes inserting, by the manager node, the N+1th node as a new member node in the communications ring responsive to receiving replies to the requesting. The inserting includes inserting the N+1th node in a selected location between two selected ones of the N nodes, such that the N nodes and the N+1th node are enabled to multicast messages around the communication ring and communications distances for the multicasted messages tend to be shorter due to the selected location of the N+1th node than would be communications distances that would arise for other possible locations of the N+1th node.

In a further aspect, the requesting includes the manager node sending to the manager node's downstream node, a compute distance message. The message includes an address of the N+1th node. The message is for each receiving one of the N node's to send to its respective downstream node in the communications ring, so that the compute distance message is multicasted throughout the communications ring. The method further includes receiving, by the manager node from the manager node's upstream node, a plurality of distance computed messages in response to the multicasted compute distance message.

In a further aspect, the inserting includes selecting, as a first one of the two selected ones of the N nodes, one of the N nodes having a shortest communications distance to the N+1th node. Also, the inserting includes selecting, as a second one of the two selected ones of the N nodes, the one of the upstream and downstream nodes of the first selected node having a shortest communications distance to the N+1th node.

In a further aspect, the communications distance measurements are based on node response times. Alternatively, or in addition, the communications distance measurements are based on numbers of routers between nodes.

In a further aspect, the inserting includes sending a change neighbour message by the manager node. The change neighbour message communicates respective upstream and downstream node designations for the two selected ones of the N nodes relative to the N+1th node. The inserting also includes the manager node receiving neighbour changed confirmation messages from the two selected ones of the N member nodes.

In another form of the invention such a method may be practiced as a method of providing a service to manage nodes in a network.

According to another form of the invention, an apparatus includes a network having nodes and a transport layer protocol providing end to end data transfer. N selected ones of the nodes are members of a virtual communications ring for multicast communication among the N nodes, each of the N member nodes being logically associated with only a logically upstream one of the N nodes and a logically downstream one of the N nodes. One of the N nodes of the communications ring is operable to provide a manager node function for managing changes in ring membership. The manager node has a processor. The network further includes a tangible, computer readable memory having program code for execution by the manager node processor.

According to another form of the invention, a computer program product is for use in a network having nodes and a transport layer protocol providing end to end data transfer. N of the nodes are members of a virtual communications ring for multicast communication among the N nodes, each of the N member nodes being logically associated with only a logically upstream one of the N nodes and a logically downstream one of the N nodes. For the communications ring, one of the N nodes functions as a manager node for managing changes in ring membership. The computer program product includes a tangible, computer usable medium including computer usable program code for execution by the manager node.

According to various forms of the invention, the program code includes first program code for requesting the others of the N member nodes to participate in measuring respective communication distances to a N+1th, non-member node responsive to the manager node receiving an insertion request message from the non-member node. The program code also includes second program code for inserting the N+1th node as a new member node in the communications ring responsive to receiving replies to the requesting. The inserting includes inserting the N+1th node in a selected location between two selected ones of the N nodes, such that the N nodes and the N+1th node are enabled to multicast messages around the communication ring and communications distances for the multicasted messages tend to be shorter due to the selected location of the N+1th node than would be communications distances that would arise for other possible locations of the N+1th node.

In another aspect, the first program code includes program code for sending a compute distance message to the manager node's downstream node, the message including an address of the N+1th node. The message is for each receiving one of the N node's to send to its respective downstream node in the communications ring, so that the compute distance message is multicasted throughout the communications ring. The program code for execution by the manager node processor includes program code for receiving a plurality of distance computed messages from the manager node's upstream node in response to the multicasted compute distance message.

In another aspect, the second program code includes program code for selecting, as a first one of the two selected ones of the N nodes, one of the N nodes having a shortest communications distance to the N+1th node. The second program code also includes program code for selecting, as a second one of the two selected ones of the N nodes, the one of the upstream and downstream nodes of the first selected node having a shortest communications distance to the N+1th node.

In another aspect, the manager node processor includes program code for measuring communications distances based on node response times. Alternatively, or in addition, the program code for execution by the manager node processor includes program code for measuring communications distances based on numbers of routers between nodes.

In another aspect, the second program code includes program code for sending a change neighbour message by the manager node, wherein the change neighbour message communicates respective upstream and downstream node designations for the two selected ones of the N nodes relative to the N+1th node. The second program code also includes program code for receiving neighbour changed confirmation messages by the manager node from the two selected ones of the N member nodes.

The foregoing, together with other objects, features, and advantages of this invention can be better appreciated with reference to the following specification, claims and drawings.

BRIEF DESCRIPTION OF THE DRAWINGS

The new and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows an example of "Full mesh network".

FIG. 2 shows an example of "Star network".

FIG. 3 shows how a token is forwarded from node to node on a Virtual Ring.

FIG. 4 shows the token message.

FIG. 5 shows how a new node is inserted into the Virtual Ring.

FIG. 6 shows the result of a new node insertion.

FIG. 7 shows an example of "Virtual Ring network".

FIG. 8 shows an example of "Virtual Ring network with improved Topology" according to the present invention.

FIG. 9 shows how a new node is inserted into the Virtual Ring after computation of a Logical Distance according to the present invention.

FIG. 10 shows the solicited removal of a node.

FIG. 11 shows the result of a reconfiguration after the loss of a node.

FIG. 12 describes the algorithm executed by a node when this node receives the token.

FIG. 13 describes the algorithm executed in the Virtual Ring Manager at receipt of the token.

FIGS. 14 and 15 describe the flows between nodes for a Node Insertion according to the present invention.

FIG. 16 describes the Insertion Algorithm in a node according to the present invention.

FIGS. 17 and 18 describe the Insertion Algorithm in the Virtual Ring Manager according to the present invention.

FIG. 19 describes the Distance Determination Algorithm in a node according to the present invention.

PREFERRED EMBODIMENT OF THE INVENTION

The present invention discloses a network topology based on a virtual ring. The N nodes of the network that need to communicate together, are logically/virtually connected according to a virtual ring, each node communicating with two and only two neighbour nodes: an upstream neighbour node and a downstream neighbour node. The present invention describes an insertion procedure to optimize the topology of this Virtual Ring and ensure a shortest path between adjacent neighbours.

Although the present invention applies to any types of nodes, this invention is particularly interesting when several nodes need to exchange a same piece of information between them.

Virtual Ring Network

Several Virtual Rings can be implemented on a same physical network, each Virtual Ring allowing a subset of nodes to communicate together. A same node can participate to several Virtual Rings at the same time. Each Virtual Ring is identified by a unique identifier (named Virtual Ring Id). The Virtual Ring identifier is statically configured in all the nodes participating in the Virtual Ring. The way the Virtual Ring is initiated and managed will be described hereafter.

TCP/IP Protocol

In a preferred embodiment, the current invention is implemented on top of the TCP layer of the TCP/IP protocol, which is today the protocol the most largely used in the world. However, the invention only uses the transport function of TCP. It is also possible to implement the invention on top of any other protocol stack providing the transport function, such as IPX (Internetwork Packet Exchange). IP has been chosen in the present description because this protocol is used in most of the networks. The transport function of TCP brings some reliability because this function handles transmission problems such as packet losses. The circulation of information along the Virtual Ring is based on the Internet Protocol (IP) and the Transmission Control Protocol (TCP). TCP has been chosen because it allows a sending of packets without risk of loss. TCP also informs of the loss of the remote node by maintaining a connection. The use of TCP and IP allows to extend the Virtual Ring to any part of an IP network including the Internet itself. It is possible to imagine nodes in different parts of the world, communicating together with such a Virtual Ring.

The User Datagram Protocol (UDP) can also be used in the current invention for instance to exchange Ring Insertion and Ring Removal messages between a specific node and the Virtual Ring Manager. Since these messages are exchanged only during the insertion or removal process, there is no need to use the TCP protocol and to establish a TCP session.

The present invention requires a new specific piece of code in each node part of the ring network. This code uses a specific TCP port and a specific UDP port reserved for the invention. This code is used to establish, maintain and tear down the Virtual Ring topology Token In order to maintain the ring topology, some pieces of information need to be periodically exchanged between the different nodes. One of these pieces of information is called "token", referring to the "Token Ring" architecture developed by IBM (IBM is a trademark of International Business Machines Corporation) these last decades. FIG. 3 describes a token (301) circulating between node A and node B on a Virtual Ring (300).

The token is used as a periodic keepalive message to validate the ring topology. The token is periodically generated by the Virtual Ring Manager (302) and forwarded by each node to its downstream neighbour node. The receipt by the Virtual Ring Manager of the token (from its upstream neighbour node), indicates that the ring topology is valid and the loop is not broken. If the ring is broken for some reason (loss of one node, loss of connectivity between 2 neighbour nodes), the loss of the token will indicate that there is a problem on the ring. Each node monitors the reception of the token. If the token has not been received after a certain amount of time, each node will trigger the Ring Recovery process detailed here after. The token is forwarded from node to node, just like any other piece of information. This means that the Token uses the TCP sessions established between the nodes.

The Sequence Number field is used to identify the current copy of the token

| Token structure | | |
|---|---|---|
| IP Header | TCP Header Source/Dest Port | Virtual Ring Token Message Code 0x0001 Virtual Ring Identifier (2 bytes) Sequence Number (4 bytes) |

The Token is described in FIG. 4

IP header (400): source IP address of the sending node and destination IP address of the next node in the Virtual Ring TCP header (401): source and destination ports=well known port reserved for the current invention Virtual Ring Token (402): This message contains 3 fields:
1. Message code (403), set to 0x0001. Allows to identify that the type of message is a Token.
2. Virtual Ring Identifier (404) on 2 bytes: identify the Virtual Ring. This allows a same node to participate to multiple Virtual Rings.
3. Sequence Number (405) on 4 bytes: it is set and incremented by the Virtual Ring Manager. This allows the Virtual Ring Manager to detect a possible duplication of the token.

Data Propagation Along the Virtual Ring

When a node participating in the Virtual Ring receives a datagram from its upstream neighbour node, it processes this datagram, i.e stores the data part of the received message, and forwards it to its downstream neighbour node so that the datagram can circulate along the Virtual Ring. However, a node connected to the Virtual Ring must be able to recognize a datagram circulating along the Virtual Ring versus a normal IP datagram received from another node which does not participate in the Virtual Ring. To do so, datagrams exchanged on the Virtual Ring have the following encapsulation:

| IP Header (20 bytes) | TCP Header Source/Dest Port (20 bytes) | Virtual Ring Header Message Code 0x0000 Virtual Ring Identifier (2 bytes) Sender IP address (4 bytes) | Data |
|---|---|---|---|

The encapsulation of the Data inside a TCP datagram has the following advantage: the datagram is transmitted along the Virtual Ring using the reliable TCP protocol. The Virtual Ring Header comprises the following fields:

1. Message code: indicates that the received message is a datagram
2. Virtual Ring Identifier: indicates on which Virtual Ring the message must be forwarded. A node may belong to multiple Virtual Rings.
3. Sender IP address: This is the IP address of the node who has generated the data.

Transmission of a Datagram on the Virtual Ring

1/ When a node needs to send a datagram on the Virtual Ring, this node adds the Virtual Ring Header described above, and encapsulates the data inside a TCP datagram. This datagram is sent to the downstream neighbour on the Virtual Ring.

2/ Each node on the Virtual Ring checks the sender address to see which node has generated the datagram. Each node then reads the data, processes it, and forwards the datagram to its downstream neighbour.

3/ When the datagram is received back by the sender Node (the sender Node checks the Sender IP address in the Virtual Ring Header), then the Sender Node removes the datagram from the Virtual Ring. This just means that the datagram is deleted and not forwarded to the downstream neighbour node again.

Virtual Ring Topology

The Virtual Ring is a list of nodes connected to form a ring. No node has the complete view of the ring. This list of nodes participating in the ring is stored nowhere in the network. Each node comprises the following information (Node Ring Record):

| |
|---|
| Virtual Ring Identifier (2 bytes) (configured) |
| Upstream Neighbour IP address (4 bytes) |
| Downstream Neighbour IP address (4 bytes) |
| Virtual Ring Manager IP address (configured) (4 bytes) |
| Backup Virtual Ring Manager IP address (configured) (4 bytes) |

Virtual Ring Manager

One of the nodes participating in the Virtual Ring plays the role of "Virtual Ring Manager". The Virtual Ring Manager is responsible for maintaining the topology of the Virtual Ring, more particularly the Virtual Ring Manager is responsible for the insertion and removal of the nodes.

It is important to note that the Virtual Ring Manager IP address is statically configured in each node of the Virtual Ring. Since the Virtual Ring Manager constitutes a single point of failure, a Backup Virtual Ring Manager is generally used. The IP address of the Backup Virtual Ring Manager is also statically configured in each node. When a node wants to be inserted into the Virtual Ring and does not receive any response from the Virtual Ring Manager, this node will contact the Backup Virtual Ring Manager.

Insertion of a Node in the Virtual Ring

FIG. 5 describes the insertion of a new node G (501) into a Virtual Ring (500) comprising nodes A, B, C, D, E, F. When a new node G (501) wants to join the Virtual Ring (500), the following scenario occurs:

Note: in a preferred embodiment, all the insertion messages use the UDP protocol and the reserved UDP port defined in the current invention.

The Node (501) to insert in the Virtual Ring (Node G), sends a "Virtual Ring Insertion Request" message (503) to the Virtual Ring Manager (502) using the configured IP address of the Virtual Ring Manager. The Node (501) to insert starts an "Insertion Request" timer and waits for a "Virtual Ring Insertion Confirmation" message (504).

The Virtual Ring Manager (502) receives the "Virtual Ring Insertion Request" message and notes the source IP address of the message, which is the IP address of Node G (501).

The Virtual Ring Manager (502) sends a "Virtual Ring Change Neighbour" message (505) to its downstream neighbour Node F (506). The Virtual Ring Manager finds the IP address of Node F in its Node Ring Record. The "Virtual Ring Change Neighbour" message comprises the IP address of Node G (501) as Upstream Neighbour IP address. The Downstream Neighbour IP address in the message is set to 0.0.0.0 because this address does not need to be changed.

Node F (506) receives the "Virtual Ring Change Neighbour" message (505). Node F tears the TCP session down with its upstream neighbour Node (the Virtual Ring Manager), by issuing a "TCP Reset" message. Node F (506) stores the IP address of Node G (501) received in the "Virtual Ring Change Neighbour" Message (505), in its Node Ring Record (Upstream Neighbour IP address).

Node F (506) establishes a TCP session with its new upstream neighbour Node, (Node G (501)) and sends a "Virtual Ring Neighbour Changed" message (507) to the Virtual Ring Manager (502) to indicate that Node F has changed its upstream neighbour Node.

The Virtual Ring Manager (502) receives the "TCP Reset" message from Node F (506) and tears the TCP session down. The Virtual Ring Manager establishes a new TCP session with Node G (501) and stores the IP address of Node G (501) in its Node Ring Record: Downstream Neighbour IP address.

The Virtual Ring Manager (502) sends a "Virtual Ring Insertion Confirmation" message (504) to Node G (501). This message comprises the IP address of Node F (506).

Node G (501) updates its Node Ring Record with:
   an Upstream Neighbour IP address equal to the Virtual Ring Manager IP address, and
   a Downstream Neighbour IP address equal to the IP address of Node F.

Node G (501) stops the "Insertion Request" timer.

If the "Insertion Request" timer expires, this means that Node G (501) has not received the "Virtual Ring Insertion Confirmation" message (504) from the Virtual Ring Manager (502). In that case, Node G (501) contacts the Backup Virtual Ring Manager (508). This process is described below in the section related to the Backup Virtual Ring Manager.

The result of the insertion of node G is described in FIG. 6. Node G (601) is now inserted on the Virtual Ring (600), between the Virtual Ring Manager (602) and Node F (603). However, this insertion procedure may result in a Virtual Ring with a non optimized topology. The new node, Node G (601) is inserted between the Virtual Ring Manager (602) and the downstream neighbour of the Virtual Ring, Node F (603), whatever the physical location of Node G (601). This may result in the Virtual Ring topology described in FIG. 7.

The insertion as shown in FIG. 7 is done without any consideration for the geographical location of the inserting node. In this example, Node E (701) is the Virtual Ring Manager. If Node G (702) needs to be inserted to the Virtual Ring (700), it will be inserted just after Node E. This could result in:
   a Virtual Ring (700) with a non optimum topology, and
   a non optimized path for data along the Virtual Ring.

The present invention proposes to improve the insertion procedure. The new node is inserted between the nearest nodes. This allows the building of an optimized Virtual Ring as described in FIG. 8. In this example, Node E (801) is the Virtual Ring Manager. Node G (802) needs to insert into the Virtual Ring (800). It will be inserted between its nearest neighbours, Node D (803) and Node A (804).

Computing Logical Distance

There are several solutions to compute a logical distance between 2 nodes:
   One way is to measure the response time, and
   Another way is to measure the number of hops, i.e. intermediate routers between the 2 nodes.

Measuring the response time is the preferred solution, because it takes into account the physical distance between the nodes, and also the throughput of the intermediate links and equipment. However, in a particular embodiment of the invention, it is also possible to measure the number of hops to compute the logical distance.

The response time can be measured using ICMP echo request and reply, also known as "Ping". 3 pings are sent and the time is measured between the echo request is sent and the echo reply is received. The average time between the 3 pings is used to measure the logical distance.

Note: ICMP (Short for Internet Control Message Protocol) is an extension to the Internet Protocol (IP). ICMP supports packets containing error, control, and informational messages. The PING command, for example, uses ICMP to test an Internet connection.

New Insertion Mechanism

In order to know where to insert the new node, it is necessary to measure the logical distance between the new node and each node already inserted in the Virtual Ring. To do so, the Virtual Ring Manager ask each node in the Virtual Ring to measure the distance to the new node.

Assuming the Virtual Ring Topology described in FIG. 9.

When a new node, Node G (902), wants to be inserted into the Virtual Ring,
   The new node to insert, Node G (902), sends a "Virtual Ring Insertion Request" to the Virtual Ring Manager, Node E (901).
   The Virtual Ring Manager, Node E (901) sends to its downstream Neighbour, Node F (905), a new message called "Virtual Ring Compute Distance" (906) in order to determine where to insert the new node and starts a "Ring Distance Timer". The new message "Virtual Ring Compute Distance" (906) comprises the IP address of Node G, and a Node Counter field, indicating the number of nodes already inserted in the Virtual Ring. This last field is set to 0001 when the message is initiated by the Virtual Ring Manager and incremented by all the nodes in the Virtual Ring.
   Each node on the Virtual Ring receiving a "Virtual Ring Compute Distance" message does the following:

it computes the distance (908) to the node to insert, Node G, using the IP address provided in the message, it sends a "Virtual Ring Distance Computed" message back to the Virtual Ring Manager (907). This message comprises Its IP address, the IP address of its upstream neighbour, the IP address of its downstream neighbour, and the computed distance to Node G (902).

it increments the Node Counter field in the "Virtual Ring Compute Distance" message and forwards this message (909) to its downstream Neighbour.

Since the "Virtual Ring Compute Distance" message is propagated along the Virtual Ring, each node in the Virtual Ring computes the distance to the new Node G (902) and reports the result back to the Virtual Ring Manager (901). The Virtual Ring Manager stores the results until the procedure is finished.

Finally, the Virtual Ring Manager:

receives the "Virtual Ring Compute Distance" message back from its upstream neighbour.

stops the "Ring Distance Timer".

verifies that the number of "Virtual Ring Distance Computed" messages it has received equals the value of the Node Counter field, which means that all the nodes in the Virtual Ring have computed their distance.

computes the best place to insert the new Node G (901). If the "Ring Distance Timer" expires and the "Virtual Ring Compute Distance" message has not been received, this means that the insertion procedure fails. If the "Virtual Ring Compute Distance" message has been received, but all the "Virtual Ring Distance Computed" messages have not been received by the Virtual Ring Manager, then the insertion procedure fails.

Best Place Decision Algorithm

First, the Virtual Ring Manager identifies the node in the Virtual Ring which is the nearest to the new Inserting Node (which is the node reporting the lowest distance). In case of equal distances, the first message received is taken. In the present example, the nearest neighbour node is Node A (910), assuming that the response time is proportional to the distance.

Once the nearest neighbour is found, the Virtual Ring Manager selects on which side to insert Node G (902) next to Node A (910). It selects the best side:

by comparing the distances received from the upstream neighbour and from the downstream neighbour of Node A, and by selecting the lowest distance.

In the present example, distance F to G is lower than distance B to G. Therefore, the best side to insert would be between node F and node A.

Finally, the Virtual Ring Manager inserts the new Node G between the nearest neighbour, Node A, and the Node F.

Insertion Mechanism

Once the decision has been taken, the Virtual Ring Manager sends a "Virtual Ring Change Neighbour" message to Node F and to Node A to insert the new Node G in between, and waits for "Virtual Ring Neighbour Changed" messages.

Finally, the Virtual Ring Manager sends a "Virtual Ring Insertion Confirm" message back to Node G, comprising the IP addresses of Node F and Node A.

Solicited Removal of a Node from the Virtual Ring

The solicited node removal scenario described in the present section corresponds to the case where a node wants to be removed from the Virtual Ring because it does not want to participate any more in the group.

Another node removal scenario corresponds to the case where a node has a failure and the Virtual Ring is broken. This unsolicited removal scenario will be described in another section.

FIG. 10 describes the Node Solicited removal process. When Node C (1001) wants to be removed from the Virtual Ring, the following scenario occurs:

Node C (1001) sends a "Virtual Ring Removal Request" message (1003) to the Virtual Ring Manager (1002). This message comprises:

the IP address of Node C (1001), the IP address of its upstream neighbour node, Node B (1004), and the IP address of its downstream neighbour node, Node D (1005).

Node C (1001) starts a "Ring Removal" Timer and waits for a "Virtual Ring Removal Confirmation" message (1006)

The Virtual Ring Manager (1002) receives the "Virtual Ring Removal Request" message (1003) from Node C (1001) and starts the removal process. It notes the IP addresses of the upstream neighbour node and downstream neighbour node of Node C.

The Virtual Ring Manager (1002) sends a "Virtual Ring Change Neighbour" message (1007) to Node B (1004), upstream neighbour node of the node to remove, Node C (1001). This message comprises:

the unchanged Upstream Node IP address: 0.0.0.0;

the Downstream Node IP address equal to the IP address of Node D (1005), which is the downstream neighbour node of Node C (1001)

The Virtual Ring Manager (1002) sends a "Virtual Ring Change Neighbour" message (1008) to Node D (1005), downstream neighbour node of the node to remove, Node C (1001). This message comprises:

the Upstream Node IP address equal to the IP address of Node B (1004), which is the upstream neighbour node of Node C (1001);

the unchanged Downstream Node IP address: 0.0.0.0.

The Virtual Ring Manager (1002) starts a "Change Neighbour" Timer of, for instance, 30 s waiting for the confirmations.

Node B (1004):

receives the "Virtual Ring Change Neighbour" message (1007) from the Virtual Ring Manager (1002) and modifies its Node Ring Record.

The Upstream Node IP address in the message is 0.0.0.0. This means that the address does not need to be changed. Node B (1004) keeps Node A (1009) as its Upstream Neighbour node.

On the other hand, Node B (1004):

modifies its Downstream Neighbour IP address and uses the address received in the message, tears the TCP connection down with Node C (1001) which was its previous downstream neighbour node, establishes a new TCP connection with its new downstream neighbour node, Node D (1005).

Node B (1004) sends a "Virtual Ring Neighbour Changed" message (1010) to the Virtual Ring Manager (1002).

Node D (1005) does the same as Node B (1004). Node D updates its Node Ring Record, tears the TCP session it had with its Upstream Neighbour, Node C (1001) down, establishes a TCP session with its new Upstream Neighbour, Node B (1004).

sends a "Virtual Ring Neighbour Changed" message (1011) to the Virtual Ring Manager (1002).

When the Virtual Ring Manager receives the "Virtual Ring Neighbour Changed" messages from both nodes B and C, it stops the "Change Neighbour" timer and sends a "Virtual Ring Removal Confirmation" message (1006) to Node C (1001) to indicate that the Removal process is successful.

Node C (1001) stops the "Ring Removal" Timer. If the "Ring Removal" Timer expires, this means that the Virtual Ring Manager (1002) has not achieved the Removal process. In this case, Node C (1001) must contact the Backup Virtual Ring Manager (1004).

Loss of a Node

The loss of a node in the Virtual Ring network is detected by its neighbour nodes with the loss the TCP connections. When a node is removed from the Virtual Ring without informing the Virtual Ring Manager by means of a "Virtual Ring Removal Request" message (which should be the case when a node failure occurs), the 2 neighbour nodes (upstream and downstream) lose their TCP connection with this node after a given period of time (after a TCP timeout). As described in FIG. 11, the following scenario occurs:

Node C (1101) in the Virtual Ring network (1100), fails or is powered off.

Node B (1103), the upstream neighbour node of Node C (1101), loses its TCP connection with Node C. Node B attempts to re-establish its TCP connection without success.

Node D (1104), downstream neighbour node of Node C (1101), loses its TCP connection with Node C. Node D attempts to re-establish its TCP connection without success.

Node B (1103) sends a "Virtual Ring Neighbour Loss Indication" (1107) message to the Virtual Ring Manager (1102). This message comprises:
the IP address of Node B, and
the Node B Downstream Neighbour IP address, i.e. address of Node C (1101).
The Upstream Neighbour IP address is set to 0.0.0.0 because no problem has been found with the upstream neighbour node of Node B.

Node D (1104) sends a "Virtual Ring Neighbour Loss Indication" (1105) message to the Virtual Ring Manager (1102). This message comprises:
the Node D IP address, and
the Node D Upstream Neighbour IP address, i.e. address of Node C (1101).
The Downstream Neighbour IP address is set to 0.0.0.0 because no problem has been found with downstream neighbour node of Node D.

The Virtual Ring Manager (1102) receives both messages from Node C upstream neighbour node and Node C downstream neighbour node. The Virtual Ring needs to be reconfigured.

The Virtual Ring Manager (1103) sends a "Virtual Ring Change Neighbour" message (1106) to Node D (1104). This message comprises:
an Upstream Neighbour IP address equal to the Node B IP address
an unchanged Downstream Neighbour IP address equal to 0.0.0.0 (the IP address does not need to be changed)

Node D (1104) updates the Upstream Neighbour IP address in its Node Ring Record and establishes a TCP connection with its new upstream neighbour node (Node B (1103)).

Node D (1104) sends a "Virtual Ring Node Changed" (1109) message back to the Virtual Ring Manager (1102) to confirm the change.

The Virtual Ring Manager (1103) sends a "Virtual Ring Change Neighbour" message (1108) to Node B (1103) comprising:
an unchanged Upstream Neighbour IP address equal to 0.0.0.0 (the IP address does not need to be changed)
a Downstream Neighbour IP address equal to the IP address of Node D.

Node B (1103) updates the Downstream Neighbour IP address in its Node Ring Record.

Node B (1103) sends a "Virtual Ring Node Changed" message (1110) back to the Virtual Ring Manager (1102) to confirm the change.

Backup Virtual Ring Manager

The Backup Virtual Ring Manager executes the same processes as the Virtual Ring Manager. The Backup Virtual Ring Manager receives Insertion, Removal and Recovery messages from the nodes in absence of response from the Virtual Ring Manager, and processes these messages like the Virtual Ring Manager.

Token Loss Recovery

All the nodes including the Virtual Ring Manager, use a timer to detect the loss of the token. When the token is lost, the ring needs to be rebuilt. The value of this timer must be larger than the TCP session timer to allow the process described in section entitled "Loss of a node" to take place before the reconfiguration of the ring. When a node detects the loss of the token, it sends a "Virtual Ring Removal Request" message to the Virtual Ring Manager and waits for the confirmation as described in FIG. 10 (refer to section entitled "Solicited Node Removal"). After a given period of time, the node sends a "Virtual Ring Insertion Request" message to the Virtual Ring Manager to participate again in the ring as described in FIG. 5 (section entitled "Insertion of a Node").

Insertion and Removal Messages

These messages are exchanged using the User Datagram Protocol (UDP). The value of the "Virtual Ring Identifier" field is used to identify the current Virtual Ring. The "Virtual Ring Identifier" is statically configured in each participating node.

| General Format | | |
|---|---|---|
| IP Header | TCP Header Source/Dest Port | Virtual Ring Message Message Code 0x.. Virtual Ring Identifier (2 bytes) ... |

| Virtual Ring Insertion Request | | |
|---|---|---|
| Message Code 0x0002 | Virtual Ring Identifier (2 bytes) | Inserting Node IP address (4 bytes) |

| Virtual Ring Insertion Confirmation | | | |
|---|---|---|---|
| Message Code 0x0003 | Virtual Ring Identifier (2 bytes) | Upstream Neighbour IP address (4 bytes) | Downstream Neighbour IP address (4 bytes) |

| Virtual Ring Change Neighbour | | | |
|---|---|---|---|
| Message Code 0x0004 | Virtual Ring Identifier (2 bytes) | Upstream Neighbour IP address (4 bytes) | Downstream Neighbour IP address (4 bytes) |

| Virtual Ring Neighbour Changed | | | |
|---|---|---|---|
| Message Code 0x0005 | Virtual Ring Identifier (2 bytes) | Upstream Neighbour IP address (4 bytes) | Downstream Neighbour IP address (4 bytes) |

| Virtual Ring Removal Request | | | | |
|---|---|---|---|---|
| Message Code 0x0006 | Virtual Ring Identifier (2 bytes) | Removing Node IP address (4 bytes) | Upstream Neighbour IP address (4 bytes) | Downstream Neighbour IP address (4 bytes) |

| Virtual Ring Removal Confirmation | |
|---|---|
| Message Code 0x0007 | Virtual Ring Identifier (2 bytes) |

| Virtual Ring Neighbour Loss Indication | | | | |
|---|---|---|---|---|
| Message Code 0x0008 | Virtual Ring Identifier (2 bytes) | Upstream Neighbour IP address (4 bytes) | Downstream Neighbour IP address (4 bytes) | Node IP address (4 bytes) |

| Virtual Ring Compute Distance | | | |
|---|---|---|---|
| Message Code 0x0009 | Virtual Ring Identifier (2 bytes) | Inserting Node IP address (4 bytes) | Node Counter (2 bytes) |

| Virtual Ring Distance Computed | | | | | |
|---|---|---|---|---|---|
| Message Code 0x000A | Virtual Ring Identifier (2 bytes) | Source Node IP address (4 bytes) | Upstream Neighbour IP address (4 bytes) | Downstream Neighbour IP address (4 bytes | Computed Distance (in ms) (4 bytes) |

Processes According to the Present Invention

Token Processing in a Node

FIG. 12 describes the algorithm executed by a node when this node receives the Token.

(1200) The Node has just been inserted into the Virtual Ring.

(1201) The Node starts the "Wait Token Timer" (typically 30 seconds) and waits for the receipt of the Token.

(1202) The Node checks whether the Token has been received or not.

(1203) If no Token has been received, the Node checks whether the Token Timer has expired or not. If the Token Timer has not expired, the Node continues to wait for the Token.

(1204) If the Token has been received, the Node checks the Token Sequence number to verify that it has been incremented since the last reception. If the Token is received for the first time (just after the node insertion), this test is not executed.

(1205) If the Token Sequence number in the received Token is correct, the Node forwards the Token to its downstream neighbour node and waits for the Token again.

(1206) If no Token has been received and if the Token Timer has expired, or if the received Token does not have the expected Token Sequence number (this means that a Token has been lost), then the Ring Recovery Procedure is executed.

Token Processing in the Virtual Ring Manager

FIG. 13 describes the algorithm executed in the Virtual Ring Manager at receipt of the Token.

(1300) The Virtual Ring Manager has just been inserted. It sets the Token Sequence number to 1, starts a "Wait Token Timer" of typically 30 seconds and a "Token Timer of 1 second". The Token Timer is used to generate a new Token every second. The Wait Token Timer is used to trigger the ring recovery procedure.

(1301) The Virtual Ring Manager forwards the Token to its downstream neighbour node and waits for the return of the Token.

(1302) The Virtual Ring Manager checks whether the Token has been received or not.

(1303) If the Token has not been received, the Virtual Ring Manager checks whether the Token Timer has expired or not.

(1304) If the Token Timer has not expired, the Virtual Ring Manager checks whether the Wait Token Timer has expired or not. If not, the Virtual Ring Manager waits for the Token again.

(1305) If no Token has been received and if the Wait Token Timer has expired, this means that the Token has been lost. Then the Virtual Ring Manager executes the ring recovery procedure.

(1306) If the token is received, the Virtual Ring Manager checks the Token Sequence number in the Token.

(1307) The Virtual Ring Manager restarts the Wait Token Timer because the token has been received and waits for the Token timer to expire.

(1308) When the Token Timer expires, the Virtual Ring Manager generates a new token, and increments the sequence number.

(1309) The Virtual Ring Manager forwards the Token to its downstream neighbour node and waits for the return of the Token.

Node Insertion—Algorithm in the Node with Logical Distance Computing

FIGS. 14 and 15 show the messages exchanged between the nodes of the Virtual Token Ring for the Node Insertion process:

(1401) the Node X to insert sends a "Virtual Ring Insertion Request" message to the Virtual Ring Manager. This message comprises the IP address of Node X.

(1402) The Virtual Ring Manager stores the IP address of Node X, and sends a "Virtual Ring Compute Distance" message to its downstream neighbour, Node F. This message comprises
the IP address of Node X, and
a Ring Counter indicating the number of nodes on the Virtual Ring. This counter is set to 1 by the Virtual Ring Manager
(1403) The receiving Node F computes the distance to Node X, by measuring the response time of a ping command. It sends back to the Virtual Ring Manager a "Virtual Ring Distance Computed" message comprising:
its IP address,
the IP address of its upstream neighbour
the IP address of its downstream neighbour, and
the computed distance to Node X.
(1404) Node F increments the Ring Counter, and forwards the "Virtual Ring Compute Distance" message to its downstream neighbour.
(1405) to (1413) The same process is performed by all the nodes on the Virtual Ring.
(1414) The Virtual Ring Manager receives the "Virtual Ring Compute Distance" message back from its upstream neighbour. This means that the process has been performed by all the nodes along the Virtual Ring.
(1501) The Virtual Ring Manager selects
the nearest neighbour to the inserting Node (i.e. the node that reported the shortest distance, Node A in the present example); and
the best neighbour of this nearest node (i.e. the neighbour of the selected Node A that has reported the shortest distance to Node X, which is node G in the present example).
The Virtual Ring Manager sends a Virtual Ring Change Neighbour to Node A. This message comprises the IP address of Node X as the new upstream neighbour.
(1502) Node A modifies its neighbour table and establishes a TCP connexion with its new upstream neighbour, Node X. It sends a "Virtual Ring Neighbour Changed" message to the Virtual Ring Manager.
(1503) The Virtual Ring Manager sends a "Virtual Ring Change Neighbour" message to Node G. This message contains the IP address of Node X as the new downstream neighbour.
(1504) Node G modifies its neighbour table and establishes a TCP connexion with its new downstream neighbour, Node X. It sends a "Virtual Ring Neighbour Changed" message to the Virtual Ring Manager.
(1505) Finally, the Virtual Ring Manager sends a "Virtual Ring Insertion Confirm" message to the node to insert, Node X. This message comprises the addresses of Node X upstream and downstream neighbour.

FIG. 16 describes the Insertion Algorithm in a node. This algorithm is run in all the nodes of the Virtual Ring, except in the inserting Node X and in the Virtual Ring Manager. The algorithm in the inserting node X is not described in the present application. It is the same as the one described in patent application WO 2005/060156 entitled "System and method for Communicating on a Virtual ring in an Internet Protocol Network" (Denecheau et al.). The algorithm in the Virtual Ring Manager is described in FIGS. 17 and 18.
(1600) Start of the algorithm.
(1601) The node checks if a "Virtual Ring Compute Distance" message has been received.
(1602) If the node receives a "Virtual Ring Compute Distance" message, it stores the IP address of the new inserting node (Node X), and the Ring Counter.
(1603) The node computes the distance to the new node to insert, Node X, using a ping response time. This algorithm is described in FIG. 7
(1604) The node sends a "Virtual Ring Distance Computed" message to the Virtual Ring Manager. This message comprises:
the node IP address,
the IP addresses of its upstream and downstream neighbours, and
the distance to Node X.
(1605) The node increments the Ring Counter.
(1606) The node forwards the "Virtual Ring Compute Distance" message to its downstream neighbour.
(1607) End of the algorithm.

FIGS. 17 and 18 describe the Insertion Algorithm in the Virtual Ring Manager:
(1700) Start of the algorithm.
(1701) Virtual Ring Manager checks whether or nor a "Virtual Ring Insertion Request" message has been received.
(1702) If a "Virtual Ring Insertion Request" message has been received, it stores the IP address of the node to insert.
(1703) Virtual Ring Manager sets the Ring Counter to 1, and sends a "Virtual Ring Compute Distance" message to its downstream neighbour. This message contains the inserting node IP address and the Ring Counter.
(1704) Virtual Ring Manager starts a Ring Distance Timer.
(1705) Virtual Ring Manager resets the Number of Received Response counter.
(1706) Virtual Ring Manager checks whether or not a "Virtual Ring Distance Computed" message has been received.
(1707) if a "Virtual Ring Distance Computed" message has been received, it stores
the address of the sending node,
the address of the upstream and downstream neighbour, and
the computed distance.
(1708) Virtual Ring Manager increments the Number of Received Response counter.
(1709) Virtual Ring Manager checks whether or not a "Virtual Ring Compute Distance" message has been received.
(1710) if a "Virtual Ring Compute Distance" message has been received, it stops the Ring Distance timer. This means that this message has been received and processed by all the nodes along the Virtual Ring.
(1711) Virtual Ring Manager stores the Ring Counter received in the message.
(1712) Virtual Ring Manager checks if the Number of Received Responses matches the Ring Counter value. If the Number of Received Responses does not match the Ring Counter value, the ring insertion fails.
(1713) If the Number of Received Responses matches the Ring Counter value, then the Virtual Ring Manager can select the best place to insert the node. This algorithm is described in next Figure (FIG. 18)
(1714) Virtual Ring Manager checks if the Ring Distance Timer has expired. If the Ring Distance Timer has not expired, it continues waiting for new messages.
(1715) If the Ring Distance Timer has expired, then the ring insertion fails. In this case, no "Virtual Ring Insertion Confirm" message will be sent back to the node to insert.
(1716) End of the algorithm, ring insertion failure.
(1800) Start of the algorithm—continuation of step (1713)

(1801) The Virtual Ring Manager selects the nearest node (i.e. the node reporting the shortest distance to the node to insert). In case of equal distance, the first response received is selected.

(1802) The Virtual Ring Manager selects the best neighbour of the nearest node, (i.e. the one of the 2 neighbours of the previously selected node, which reports the shortest distance to the node to insert).

(1803) The Virtual Ring Manager sends a "Virtual Ring Change Neighbour" message to the nearest node.

(1804) The Virtual Ring Manager sends a "Virtual Ring Change Neighbour" message to its best neighbour.

(1805) The Virtual Ring Manager starts the Change Neighbour Timer (1806) The Virtual Ring Manager checks whether or not the "Virtual Ring Neighbour Changed" messages have been received from both nodes.

(1807) If the "Virtual Ring Neighbour Changed" messages have been received from both nodes, the Virtual Ring Manager sends a "Virtual Ring Insertion Confirm" message to the node to insert.

(1808) End of the algorithm.

(1809) If the Virtual Ring Manager has not received both Virtual Ring Neighbour Changed messages, it checks if the Change Neighbour timer has expired.

(1810) If the Change Neighbour timer expired, then the Ring Insertion failed. No "Virtual Ring Insertion Confirm" message is sent to the node to insert.

FIG. 19 describes the Distance Determination Algorithm in a node:

(1900) Start of the algorithm.

(1901) The node resets the Ping Counter (1902) The node sends an ICMP Echo Request to the inserting node.

(1903) The node store the current time.

(1904) The node checks if an ICMP Echo Reply has been received from the inserting node. If no ICMP Echo Reply has been received from the inserting node, the node keeps waiting for the ICMP Echo Reply.

(1905) If the Echo Reply has been received, the node computes the response time=current time−time when the Echo Request has been sent (1906) The node increments the Ping Counter.

(1907) The node checks if the Ping Counter equals 3 (i.e. if 3 Echo Requests and Replies have been exchanged). If not, the node sends another Echo Request.

(1908) if 3 pings have been exchanged, the node computes the average response time=sum of the response times divided by 3. This average response time indicates the distance.

(1909) End of the algorithm.

ADVANTAGE OF THE PRESENT INVENTION

The proposed insertion procedure allows to insert a new node at the best position in the Virtual Ring, based on the physical location and the computed distance. The new node is inserted between its closest neighbours, ensuring a shortest path between two adjacent neighbours, and therefore the shortest distance on the Virtual Ring.

The advantage to have the shortest distance path between two adjacent neighbours is to optimize the performance and the reactivity of the Virtual Ring, mainly in an International Communication context where the Transmission Delay is particularly important.

What is claimed is:

1. A method in a network having nodes and a transport layer protocol providing end to end data transfer, wherein N of the nodes are members of a virtual communications ring for multicast communication among the N nodes, each of the N member nodes being logically associated with only a logically upstream one of the N nodes and a logically downstream one of the N nodes, and wherein for the communications ring one of the N nodes functions as a manager node for managing changes in ring membership, the method comprising:

receiving a first request from the manager node via the communication ring by one of the N member nodes, wherein the first request is received by the one node from the one node's upstream node and is for signaling the one node to participate in insertion of a N+1th, non-member node in the communications ring;

forwarding, by the one node, the received first request to the one node's downstream node in the communication ring; and sending by the one node to the one node's downstream node a reply for the manager node responsive to the received first request, wherein the receiving of the first request includes:

receiving a compute distance message from the manager node, wherein the compute distance message has an address of the N+1th node; and wherein the method includes:

computing, by the one node, a distance between the one node and the N+1th node; and wherein sending the reply includes:

sending a distance computed message for the manager node, wherein the distance computed message includes the computed distance;

wherein the reply provides the manager node information for enabling the N nodes and the N+1th node to multicast messages around the communication ring, so that the first request is passed around the ring back to the manager node and respective distances for the distance computer message are generated by the non-manager ones of the N nodes, wherein responsive to the replies the manager node selects a location for inserting the N+1th node as the N+1th member node between two selected ones of the N nodes in the communications ring such that communications distances for the multicasted messages tend to be shorter due to the selected location of the N+1th node than communications distances that would arise for other possible locations of the N+1th node in the communications ring.

2. The method of claim 1, wherein the method further includes:

receiving, by the one node, a second request from the manager node;

determining by the one node that the second request is a validation request;

forwarding, by the one node, the received validation request to the one node's downstream node in the communication ring for validating topology of the ring by the validation request being passed around the ring so that the validation request is returned back to the manager node.

3. The method of claim 2, wherein the forwarding of the validation request is responsive to whether the validation request from the manager node is received by the one node via the one node's upstream node.

4. The method of claim 2, wherein the receiving of the validation request by the one node includes receiving repeated instances of the validation request, and wherein the validation request includes indicia incremented by the managing node for the respective instances.

5. The method of claim 2, comprising the steps of:
timing, by the one node, respective intervals between instances of the validation request, wherein the timing is to confirm an alive state of the ring; and
detecting, by the one node, loss of the alive state of the ring responsive to expiration of a time limit for one of the intervals between instances of the validation request; and
sending, by the one node, a request to remove the one node from the ring responsive to detecting loss of the alive state.

6. The method of claim 1, wherein in the selecting of the location for inserting the N+1th node, the selecting is independent of distances between neighbouring ones of the N nodes.

7. The method of claim 1, wherein the reply from the one node includes identity of upstream and downstream neighbouring nodes, so that the manager node selects first and second nodes among the N nodes in the ring where between the manager node inserts the N+1th node, wherein the selecting is responsive to the identities of the upstream and downstream neighbouring nodes and the distances between respective nodes responding to the first request and the N+1th node and is independent of distances between neighbouring ones of the N nodes.

8. An apparatus comprising:
a first node coupled via a transport layer, network communication protocol in a virtual communications ring of nodes to provide end to end data transfer by multicast communication among the nodes, each of the member nodes being logically associated in the ring with only a logically upstream one of the nodes and a logically downstream one of the N nodes, wherein the first node includes a computer system coupled to a tangible, computer readable memory, wherein the computer system is programmed to:
receive a first request from an initiating one of the nodes via the communication ring, wherein the first request is received by the first node from the first node's upstream node and is for signaling the first node to participate in insertion of a N+1th, non-member node in the communications ring;
forward the received first request to the first node's downstream node in the communication ring; and
send to the first node's downstream node a reply for the initiating node responsive to the received first request, wherein the receiving of the first request includes:
receiving a compute distance message from the initiating node, wherein the compute distance message has an address of the N+1th node; and
wherein the computer system is programmed to:
compute a distance between the one node and the N+1th node; and
wherein sending the reply includes:
sending a distance computed message for the initiating node, wherein the distance computed message includes the computed distance;
wherein the reply provides the initiating node information for enabling the N nodes and the N+1th node to multicast messages around the communication ring, so that the first request is passed around the ring back to the initiating node and respective distances for the distance computer message are generated by the non-initiating ones of the N nodes, wherein responsive to the replies the initiating node selects a location for inserting the N+1th node as the N+1th member node between two selected ones of the N nodes in the communications ring such that communications distances for the multicasted messages tend to be shorter due to the selected location of the N+1th node than communications distances that would arise for other possible locations of the N+1th node in the communications ring.

9. The apparatus of claim 8, wherein the computer system is programmed to receive a validation request from an initiating one of the N nodes, and to determine that the second request is a validation request; and
forward the received validation request to the first node's downstream node in the communication ring for validating topology of the ring by the validation request being passed around the ring so that the validation request is returned back to the initiating node.

10. The apparatus of claim 9, wherein the forwarding of the validation request is responsive to whether the validation request from the initiating node is received by the first node via the first node's upstream node.

11. The apparatus of claim 9, wherein the computer system is programmed to:
time respective intervals between instances of the validation request, wherein the timing is to confirm an alive state of the ring;
detect loss of the alive state of the ring responsive to expiration of a time limit for one of the intervals between instances of the validation request; and
send a request to remove the one node from the ring responsive to detecting loss of the alive state.

12. The apparatus claim 8, wherein in the selecting of the location for inserting the N+1th node, the selecting is independent of distances between neighbouring ones of the N nodes.

13. The apparatus of claim 8, wherein the reply from the one node includes identity of upstream and downstream neighbouring nodes, so that the initiator node selects first and second nodes among the N nodes in the ring where between the initiator node inserts the N+1th node, wherein the selecting is responsive to the identities of the upstream and downstream neighbouring nodes and the distances between respective nodes responding to the first request and the N+1th node and is independent of distances between neighbouring ones of the N nodes.

14. A non-transitory computer-readable storage medium with an executable program stored thereon, wherein the program is for a computer system performing as a first node in a network having nodes and a transport layer protocol providing end to end data transfer, wherein N of the nodes are members of a virtual communications ring for multicast communication among the N nodes, each of the N member nodes being logically associated in the ring with only a logically upstream one of the N nodes and a logically downstream one of the N nodes, and wherein for the communications ring one of the N nodes functions as a manager node for managing changes in ring membership, wherein the programs instructs the computer system to perform the following:
receiving a first request from an initiating one of the nodes via the communication ring, wherein the first request is received by the first node from the first node's upstream node and is for signaling the first node to participate in insertion of a N+1th, non-member node in the communications ring;
forwarding, by the first node, the received first request to the first node's downstream node in the communication ring; and sending to the first node's downstream node a reply for the initiating node responsive to the received first request, wherein the receiving of the first request includes:

receiving a compute distance message from the initiating node, wherein the compute distance message has an address of the N+1th node; and wherein the programs instructs the computer system to perform the following:

computing, responsive to the first request, a distance between the one node and the N+1th node; and wherein the sending of the reply to the first node's downstream node includes:

sending a distance computed message for the initiator node, wherein the distance computed message includes the computed distance;

wherein the reply provides the initiating node information for enabling the N nodes and the N+1th node to multicast messages around the communication ring, so that the first request is passed around the ring back to the initiating node and respective distances for the distance computer message are generated by the non-initiating ones of the N nodes, wherein responsive to the replies the initiating node to select a location for inserting the N+1th node as the N+1th member node between two selected ones of the N nodes in the communications ring such that communications distances for the multicasted messages tend to be shorter due to the selected location of the N+1th node than communications distances that would arise for other possible locations of the N+1th node in the communications ring.

15. The non-transitory computer-readable storage medium of claim 14, wherein the program instructs the computer system to perform the following:

receiving a second request from an initiating one of the N nodes, and for the first node determining that the second request is a validation request; and forwarding the received validation request to the first node's downstream node in the communication ring for validating topology of the ring by the validation request being passed around the ring so that the validation request is returned back to the initiating node.

16. The non-transitory computer-readable storage medium of claim 15, wherein the forwarding of the validation request is responsive to whether the validation request from the initiating node is received by the first node via the first node's upstream node.

17. The non-transitory computer-readable storage medium of claim 14, wherein the receiving of the validation request by the first node includes receiving repeated instances of the validation request, and wherein the validation request includes indicia incremented by the initiating node for the respective instances, and wherein the forwarding by the first node of each instance of the validation request is responsive to verifying by the first node that the indicia has been incremented between instances.

18. The non-transitory computer-readable storage medium of claim 14, wherein the program instructs the computer system to perform the following:

timing respective intervals between instances of the validation request, wherein the timing is to confirm an alive state of the ring;

detecting, by the one node, loss of the alive state of the ring responsive to expiration of a time limit for one of the intervals between instances of the validation request; and sending, by the one node, a request to remove the one node from the ring responsive to detecting loss of the alive state.

19. The non-transitory computer-readable storage medium of claim 14, wherein in the selecting of the location for inserting the N+1th node, the selecting is independent of distances between neighbouring ones of the N nodes.

20. The non-transitory computer-readable storage medium of claim 14, wherein the reply from the one node includes identity of upstream and downstream neighbouring nodes, so that the manager node selects first and second nodes among the N nodes in the ring where between the manager node inserts the N+1th node, wherein the selecting is responsive to the identities of the upstream and downstream neighbouring nodes and the distances between respective nodes responding to the first request and the N+1th node and is independent of distances between neighbouring ones of the N nodes.

\* \* \* \* \*